(12) United States Patent
Papish et al.

(10) Patent No.: US 11,103,861 B2
(45) Date of Patent: Aug. 31, 2021

(54) LIGHT DRIVEN METAL PINCER PHOTOCATALYSTS FOR CARBON DIOXIDE REDUCTION TO CARBON MONOXIDE

(71) Applicants: The Board of Trustees of The University of Alabama, Tuscaloosa, AL (US); University of Mississippi, Oxford, MS (US)

(72) Inventors: Elizabeth T. Papish, Tuscaloosa, AL (US); Jared Heath Delcamp, Oxford, MS (US)

(73) Assignees: The Board of Trustees of The University of Alabama, Tuscaloosa, AL (US); University of Mississippi, Oxford, MS (US)

( * ) Notice: Subject to any disclaimer, the term of this patent is extended or adjusted under 35 U.S.C. 154(b) by 268 days.

(21) Appl. No.: 16/131,545

(22) Filed: Sep. 14, 2018

(65) Prior Publication Data
US 2019/0083966 A1    Mar. 21, 2019

Related U.S. Application Data

(60) Provisional application No. 62/558,669, filed on Sep. 14, 2017.

(51) Int. Cl.
*B01J 31/22*       (2006.01)
*B01J 31/18*       (2006.01)
(Continued)

(52) U.S. Cl.
CPC ....... *B01J 31/2273* (2013.01); *B01J 31/0202* (2013.01); *B01J 31/0237* (2013.01);
(Continued)

(58) Field of Classification Search
CPC ............... B01J 31/2273; B01J 31/0244; B01J 31/1815; B01J 31/0271; B01J 31/0242; B01J 31/181; B01J 31/0237; B01J 31/0202; B01J 2531/827; B01J 2531/825; B01J 2531/16; B01J 2531/0294; B01J 2531/0244; B01J 2540/10; B01J 2531/0205; B01J 2231/625;
(Continued)

(56) References Cited

U.S. PATENT DOCUMENTS

2012/0205554 A1*   8/2012   Hollis ................... H05B 33/10
                                                                                     250/459.1
2019/0016741 A1    1/2019   Hollis et al.
2020/0095228 A1    3/2020   Hollis et al.

FOREIGN PATENT DOCUMENTS

WO        2013033018 A2    3/2013

OTHER PUBLICATIONS

Agarwal, et al., "Design of a Catalytic Active Site for Electrochemical CO2 Reduction with Mn(I)-Tricarbonyl Species", Inorg. Chem., 2015, 54, 5285-5294.
(Continued)

*Primary Examiner* — Daniel C. McCracken
(74) *Attorney, Agent, or Firm* — Meunier Carlin & Curfman LLC

(57) ABSTRACT

Disclosed are N-heterocyclic carbene (NHC) and 4-pyridinol-derived pincer ligands and metal complexes containing these ligands. These compounds can be used to photocatalyticaly reduce $CO_2$ to CO.

20 Claims, 8 Drawing Sheets

(51) Int. Cl.
| | |
|---|---|
| B01J 31/02 | (2006.01) |
| C01B 32/40 | (2017.01) |
| C07F 15/00 | (2006.01) |
| C07F 15/04 | (2006.01) |
| C07F 19/00 | (2006.01) |
| C07F 15/06 | (2006.01) |
| C07F 15/02 | (2006.01) |

(52) U.S. Cl.
CPC ....... *B01J 31/0242* (2013.01); *B01J 31/0244* (2013.01); *B01J 31/0271* (2013.01); *B01J 31/181* (2013.01); *B01J 31/1815* (2013.01); *C01B 32/40* (2017.08); *C07F 15/0046* (2013.01); *C07F 15/02* (2013.01); *C07F 15/04* (2013.01); *C07F 15/06* (2013.01); *C07F 19/00* (2013.01); *B01J 2231/625* (2013.01); *B01J 2531/0205* (2013.01); *B01J 2531/0244* (2013.01); *B01J 2531/0294* (2013.01); *B01J 2531/16* (2013.01); *B01J 2531/821* (2013.01); *B01J 2531/825* (2013.01); *B01J 2531/827* (2013.01); *B01J 2531/842* (2013.01); *B01J 2531/845* (2013.01); *B01J 2531/847* (2013.01); *B01J 2540/10* (2013.01)

(58) Field of Classification Search
CPC ............ B01J 2531/821; B01J 2531/847; B01J 2531/842; B01J 2531/845; C07F 19/00; C07F 15/06; C07F 15/02; C07F 15/0046; C07F 15/04; C01B 32/40
See application file for complete search history.

(56) References Cited

OTHER PUBLICATIONS

Agarwal, et al., "NHC-containing manganese(I) electrocatalysts for the two-electron reduction of CO2.", Angew. Chem. Int. Ed., 2014, 53, 5152-5155.

Appel, et al., "Frontiers, Opportunities, and Challenges in Biochemical and Chemical Catalysis of CO2 Fixation." Chemical Reviews 2013, 113 (8), 6621-6658.

Arduengo, "Looking for stable carbenes: the difficulty in starting anew", Acc. Chem. Res., 1999, 32, 913-921.

Aresta, et al., "Catalysis for the Valorization of Exhaust Carbon: from CO2 to Chemicals, Materials, and Fuels. Technological Use of CO2." Chemical Reviews 2014, 114 (3), 1709-1742.

Atoguchi, et al., "Electrocatalytic activity of CoII TPP-pyridine complex modified carbon electrode for CO2 reduction." Journal of Electroanalytical Chemistry and Interfacial Electrochemistry 1991, 318 (1), 309-320.

Badiei, et al., "Cp* Co (III) catalysts with proton-responsive ligands for carbon dioxide hydrogenation in aqueous media", Inorg. Chem., 2013, 52, 12576-12586.

Bauer and X. Hu, "Recent developments of iron pincer complexes for catalytic applications", Inorg. Chem. Front., 2016, 3, 741-765.

Benson, et al., "Electrocatalytic and homogeneous approaches to conversion of CO2 to liquid fuels." Chemical Society Reviews 2009, 38 (1), 89-99.

Bhattacharya, et al., "Synthesis and Catalytic Applications of Iron Pincer Complexes." Comments on Inorganic Chemistry 2011, 32 (2), 88-112.

Bonin, et la., "Selective and Efficient Photocatalytic CO2 Reduction to CO Using Visible Light and an Iron-Based Homogeneous Catalyst." Journal of the American Chemical Society 2014, 136 (48), 16768-16771.

Bonin, et al., "Homogeneous photocatalytic reduction of CO2 to CO using iron (0) porphyrin catalysts: mechanism and intrinsic limitations", ChemCatChem, 2014, 6, 3200-3207.

Boudreaux, et al., "Ruthenium(II) complexes of pyridinol and N-heterocyclic carbene derived pincers as robust catalysts for selective carbon dioxide reduction" Chem. Commun. 2017, Chem. Commun., 2017, 53, 11217-11220. dx.doi.org/10.1039/c7cc05706g.

Bourrez, et al., "[Mn(bipyridyl)(CO)3Br]: An Abundant Metal Carbonyl Complex as Efficient Electrocatalyst for CO2 Reduction." Angewandte Chemie International Edition 2011, 50 (42), 9903-9906.

Burks, et al., "Nickel(ii) pincer complexes demonstrate that the remote substituent controls catalytic carbon dioxide reduction.", Chem. Commun., 2018, 54, 3819-3822. DOI: 10.1039/C7CC09507D.

Cao, et al., "Hydroamination of Unactivated Alkenes Catalyzed by Novel Platinum(II) N-Heterocyclic Carbene Complexes", Organometallics, 2012, 31, 921-929.

Chen, et al., "Splitting CO2 into CO and O2 by a single catalyst." Proceedings of the National Academy of Sciences 2012, 109 (39), 15606-15611.

Costentin, et al., "A Local Proton Source Enhances CO$_2$ Electroreduction to CO by a Molecular Fe Catalyst." Science 2012, 338 (6103), 90-94.

Costentin, et al., "Current Issues in Molecular Catalysis Illustrated by Iron Porphyrins as Catalysts of the CO2-to-Co Electrochemical Conversion", Acc. Chem. Res., 2015, 48, 2996-3006.

Danopoulos, et al., "Mono-N-heterocyclic carbene amido and alkyl complexes. Cobalt-mediated C-H activation and C-C coupling reactions involving benzyl ligands on a putative 3-coordinate intermediate." Dalton Transactions 2013, 42 (20), 7276-7280.

Danopoulos, et al., "Structural and Reactivity Studies of "Pincer" Pyridine Dicarbene Complexes of Fe$^0$: Experimental and Computational Comparison of the Phosphine and NHC Donors", Chem. Eur. J., 2009, 15, 5491-5502.

Danopoulos, et al., "Molecular N2 complexes of iron stabilised by N-heterocyclic 'pincer' dicarbene ligands", Chem. Commun., 2005, 0, 784-786.

DePasquale, et al., "Iridium Dihydroxybipyridine Complexes Show That Ligand Deprotonation Dramatically Speeds Rates of Catalytic Water Oxidation" Inorg. Chem., 2013, 52, 9175-9183.

Dhanasekaran, et al., "p-Terphenyl-Sensitized Photoreduction of CO2 with Cobalt and Iron Porphyrins. Interaction between CO and Reduced Metalloporphyrins." The Journal of Physical Chemistry A 1999, 103 (38), 7742-7748.

Dixon, et al., "Dramatic Tuning of Ligand Donor Properties in (Ttz)CuCO through Remote Binding of H+ (Ttz = tris(triazolyl)borate" Chem. Commun., 2013, 49, 5571-5573. dx.doi.org/10.1039/C3CC00036B.

Duan, et al., "Non-innocent Proton-Responsive Ligand Facilitates Reductive Deprotonation and Hinders CO2 Reduction Catalysis in [Ru(tpy)(6DHBP)(NCCH3)]2+ (6DHBP = 6,6'-(OH)2bpy)", Inorg. Chem., 2016, 55, 4582-4594.

Elgrishi, et al., "Turning it off! Disfavouring hydrogen evolution to enhance selectivity for CO production during homogeneous CO 2 reduction by cobalt-terpyridine complexes", Chem. Sci., 2015, 6, 2522-2531.

Elgrishi, et al., "Terpyridine complexes of first row transition metals and electrochemical reduction of CO2 to CO." Physical Chemistry Chemical Physics 2014, 16 (27), 13635-13644.

Ettedgui, et al., "Photoreduction of Carbon Dioxide to Carbon Monoxide with Hydrogen Catalyzed by a Rhenium(I) Phenanthroline-Polyoxometalate Hybrid Complex." Journal of the American Chemical Society 2011, 133 (2), 188-190.

Fei, et al., "Photocatalytic CO2 Reduction to Formate Using a Mn(I) Molecular Catalyst in a Robust Metal—Organic Framework." Inorganic Chemistry 2015, 54 (14), 6821-6828.

Froehlich, Jet al., "Homogeneous CO2 Reduction by Ni(cyclam) at a Glassy Carbon Electrode." Inorganic Chemistry 2012, 51 (7), 3932-3934.

Gerlach, et al., "Ruthenium (II) and Iridium (III) Complexes of N-Heterocyclic Carbene and Pyridinol Derived Bidentate Chelates: Synthesis, Characterization, and Reactivity", Inorg. Chim. Acta, 2017, 466, 442-450.

(56) References Cited

OTHER PUBLICATIONS

Gerlach, et al., "Studies of the pathways open to copper water oxidation catalysts containing proximal hydroxy groups during basic electrocatalysis", Inorg. Chem., 2014, 53, 12689-12698.
Gründemann, et al., "Tridentate Carbene CCC and CNC Pincer Palladium(II) Complexes: Structure, Fluxionality, and Catalytic Activity" Organometallics, 2001, 20, 5485-5488.
Ha, et al., "High-turnover visible-light photoreduction of CO2 by a Re(i) complex stabilized on dye-sensitized TiO2." Chemical Communications 2014, 50 (34), 4462-4464.
Hawecker, et al., "Efficient photochemical reduction of CO2 to CO by visible light irradiation of systems containing Re(bipy)(CO)3X or Ru(bipy)32+-Co2+ combinations as homogeneous catalysts." Journal of the Chemical Society, Chemical Communications 1983, (9), 536-538.
Hay, et al., "Ab initio effective core potentials for molecular calculations. Potentials for the transition metal atoms Sc to Hg." The Journal of Chemical Physics 1985, 82 (1), 270-283.
Hay, et al., "The preparation, chemistry and crystal structure of the nickel(II) complex of N-hydroxyethylazacyclam [3-(2'-hydroxyethyl)-1,3,5,8,12-penta-azacyclotetradecane nickel(II) perchlorate]. A new electrocatalyst for CO2 reduction." Polyhedron 1997, 16 (20), 3557-3563.
Hong, et al., "Visible-Light-Driven Photocatalytic CO2 Reduction by a Ni(II) Complex Bearing a Bioinspired Tetradentate Ligand for Selective CO Production.", J. Am. Chem. Soc., 2017, 139, 6538-6541.
Hübschle, et al., "ShelXle: a Qt graphical user interface for SHELXL." J. Appl. Cryst. 2011, 44, 1281-1284.
Huckaba, et al., "Photocatalytic Reduction of CO2 with Re-Pyridyl-NHCs." Inorganic Chemistry 2016, 55 (2), 682-690.
Hull, et al., "Reversible hydrogen storage using CO2 and a proton-switchable iridium catalyst in aqueous media under mild temperatures and pressures", Nature Chem., 2012, 4, 383-388.
Inamoto, et al., "Synthesis and Catalytic Activity of a Pincer-Type Bis(imidazolin-2-ylidene) Nickel(II) Complex", Organometallics, 2006, 25, 3095-3098.
Ishida, et al., "Electrochemical CO2 reduction catalyzed by ruthenium complexes [Ru(bpy)2(CO)2]2+ and [Ru(bpy)2(CO)C1]+. Effect of pH on the formation of CO and HCOO." Organometallics 1987, 6 (1), 181-186.
Ishida, et al., "Ligand effects of ruthenium 2,2[prime or minute]-bipyridine and 1,10-phenanthroline complexes on the electrochemical reduction of CO2." Journal of the Chemical Society, Dalton Transactions 1990, (7), 2155-2160.
Ishida, et al., "Photochemical carbon dioxide reduction catalyzed by bis(2,2'-bipyridine)dicarbonylruthenium(2+) using triethanolamine and 1-benzyl-1,4-dihydronicotinamide as an electron donor." Inorganic Chemistry 1990, 29 (5), 905-911.
Jarowicki, et al., "Protecting Groups", J. Chem. Soc., Perkin Trans. 1, 1999, 1589-1616.
Jupally, et al., "Au137(SR)56 nanomolecules: composition, optical spectroscopy, electrochemistry and electrocatalytic reduction of CO2." Chemical Communications 2014, 50 (69), 9895-9898.
Kang, et al., "Single catalyst electrocatalytic reduction of CO2 in water to H2+CO syngas mixtures with water oxidation to O2." Energy & Environmental Science 2014, 7 (12), 4007-4012.
Kang, et al., "Electrocatalytic Reduction of Carbon Dioxide: Let the Molecules Do the Work", Top. Catal., 2014, 58, 30-45.
Kuehnel, et al., "Selective Photocatalytic CO2 Reduction in Water through Anchoring of a Molecular Ni Catalyst on CdS Nanocrystals", J. Am. Chem. Soc., 2017, 139, 7217-7223.
Kuriyama, et al., Catalytic formation of ammonia from molecular dinitrogen by use of dinitrogen-bridged dimolybdenum-dinitrogen complexes bearing PNP-pincer ligands: remarkable effect of substituent at PNP-pincer ligand., J. Am. Chem. Soc., 2014, 136, 9719-9731.
Lehn, et al., "Photochemical reduction of carbon dioxide to formate catalyzed by 2,2t-bipyridine- or 1,10-phenanthroline-ruthenium(II) complexes." Journal of Organometallic Chemistry 1990, 382 (1), 157-173.
Li, et al., "Improving the Efficiency of the Hydrogenation of Carbonates and Carbon Dioxide to Methanol." ChemCatChem 2013, 5 (5), 1072-1074.
Liyanage, et al., "Electrocatalytic Reduction of CO2 to CO With Re-Pyridyl-NHCs: Proton Source Influence on Rates and Product Selectivities.", Inorganic Chemistry 2016, 55 (12), 6085-6094.
Poyatos, et al., "New Ruthenium(II) CNC-Pincer Bis(carbene) Complexes: Synthesis and Catalytic Activity", Organometallics, 2003, 22, 1110-1114.
Manbeck, et la., "Push or Pull? Proton Responsive Ligand Effects in Rhenium Tricarbonyl CO2 Reduction Catalysts", The Journal of Physical Chemistry B, 2015, DOI: 10.1021/jp511131x, 7457-7466.
Marelius, et al., "How Do Proximal Hydroxy or Methoxy Groups on the Bidentate Ligand Affect [(2,2';6',2"-Terpyridine)Ru(N,N)X] Water-Oxidation Catalysts? Synthesis, Characterization, and Reactivity at Acidic and Near-Neutral pH", Eur. J. Inorg. Chem., 2014, 2014, 676-689.
Matsubara, et al., "Thermodynamic Aspects of Electrocatalytic CO2 Reduction in Acetonitrile and with an Ionic Liquid as Solvent or Electrolyte", ACS Catal., 2015, 5, 6440-6452.
Mikkelsen, et al, "The teraton challenge. A review of fixation and transformation of carbon dioxide." Energy & Environmental Science 2010, 3 (1), 43-81.
Milstein, D., "Discovery of Environmentally Benign Catalytic Reactions of Alcohols Catalyzed by Pyridine-Based Pincer Ru Complexes, Based on Metal—Ligand Cooperation." Topics in Catalysis 2010, 53 (13), 915-923.
Moore, et al., "Simple Ligand Modifications with Pendent OH Groups Dramatically Impact the Activity and Selectivity of Ruthenium Catalysts for Transfer Hydrogenation: The Importance of Alkali Metals", ACS Catal., 2016, 6, 1981-1990.
Morris, et al., "Molecular Approaches to the Photocatalytic Reduction of Carbon Dioxide for Solar Fuels." Accounts of Chemical Research 2009, 42 (12), 1983-1994.
Nakada, et al., "Photocatalytic CO2 Reduction to Formic Acid Using a Ru(II)—Re(I) Supramolecular Complex in an Aqueous Solution." Inorganic Chemistry 2015, 54 (4), 1800-1807.
Nieto, et al., "Transfer Hydrogenation in Water via a Ruthenium Catalyst with OH Groups near the Metal Center on a bipy Scaffold", Organometallics, 2011, 30, 6339-6342.
Ogata, et al., "Mechanistic and Kinetic Studies of Cobalt Macrocycles in a Photochemical CO2 Reduction System: Evidence of Co-CO2 Adducts as Intermediates." Journal of the American Chemical Society 1995, 117 (25), 6708-6716.
Park, et al., "Ru(II) complexes with N-heterocyclic carbene ligandsor terpyridine analogues: synthesis, characterization, and electrochemical and proton-dependent spectrometric properties", Dalton Trans., 2012, 41, 5678-5686.
Park, et al., "Unsymmetric Ru(II) Complexes with N-Heterocyclic Carbene and/or Terpyridine Ligands: Synthesis, Characterization, Ground- and Excited-State Electronic Structures and Their Application for DSSC Sensitizers", Inorg. Chem., 2010, 49, 7340-7352.
Peris, et al., "A Pd complex of a tridentate pincer CNC bis-carbene ligand as a robust homogenous Heck catalyst." Chemical Communications 2001, (2), 201-202.
Qiao, et al., "A review of catalysts for the electroreduction of carbon dioxide to produce low-carbon fuels." Chemical Society Reviews 2014, 43 (2), 631-675.
Qu, et al., "Ruthenium Complexes are pH-Activated Metallo Prodrugs (pHAMPs) with Light-Triggered Selective Toxicity Toward Cancer Cells.", Inorg. Chem. 2017, 56, 7519-7532. dx.doi.org/10.1021/acs.inorgchem.7b01065.
Rao, et al., "Non-sensitized selective photochemical reduction of CO2 to CO under visible light with an iron molecular catalyst.", Chem. Commun., 2017, 53, 2830-2833.
Reed, et al., "Natural population analysis", J. Chem. Phys., 1985, 83, 735-746.
Robert, M., "Running the Clock: CO2 Catalysis in the Age of Anthropocene", ACS Energy Lett., 2016, 1, 281-282.

(56) References Cited

OTHER PUBLICATIONS

Rosenthal, "Progress Toward the Electrocatalytic Production of Liquid Fuels from Carbon Dioxide", in Progress in Inorganic Chemistry, vol. 59, First Edition.2014, 1-40.
Rountree, et al., "Evaluation of Homogeneous Electrocatalysts by Cyclic Voltammetry." Inorganic Chemistry 2014, 53 (19), 9983-10002.
Sahara, et al., "Efficient Photocatalysts for CO2 Reduction." Inorganic Chemistry 2015, 54 (11), 5096-5104.
Sahoo, et al., "Phosphine-pyridonate ligands containing octahedral ruthenium complexes: access to esters and formic acid", Catal. Sci. Technol., 2017, 7, 3492-3498. DOI: 10.1039/c1037cy00932a.
Sampson and C. P. Kubiak, "Manganese electrocatalysts with bulky bipyridine ligands: utilizing Lewis acids to promote carbon dioxide reduction at low overpotentials", J. Am. Chem. Soc., 2016, 138, 1386-1393.
Sampson, et al., "Manganese Catalysts with Bulky Bipyridine Ligands for the Electrocatalytic Reduction of Carbon Dioxide: Eliminating Dimerization and Altering Catalysis." Journal of the American Chemical Society 2014, 136 (14), 5460-5471.
Sato, et al., "Selective CO2 Conversion to Formate Conjugated with H2O Oxidation Utilizing Semiconductor/Complex Hybrid Photocatalysts." Journal of the American Chemical Society 2011, 133 (39), 15240-15243.
Sato, et al., "A Highly Efficient Mononuclear Iridium Complex Photocatalyst for CO2 Reduction under Visible Light." Angewandte Chemie International Edition 2013, 52 (3), 988-992.
Savéant, et al., "Molecular Catalysis of Electrochemical Reactions. Mechanistic Aspects." Chemical Reviews 2008, 108 (7), 2348-2378.
Schneider, et al., "Nickel(ii) macrocycles: highly efficient electrocatalysts for the selective reduction of CO2 to CO." Energy & Environmental Science 2012, 5 (11), 9502-9510.
Schneider, et al., "Thermodynamics and kinetics of CO2, CO, and H+ binding to the metal centre of CO2reductioncatalysts." Chemical Society Reviews 2012, 41 (6), 2036-2051.
Schreier, et al., "Efficient and selective carbon dioxide reduction on low cost protected Cu2O photocathodes using a molecular catalyst." Energy & Environmental Science 2015, 8 (3), 855-861.
Sheldrick, "A short history of SHELX", Acta Cryst. 2008, A64, 112-122.
Sheng, et al., "A nickel complex with a biscarbene pincer-type ligand shows high electrocatalytic reduction of CO2 over H2O." Dalton Transactions 2015, 44 (37), 16247-16250.
Siek, et al., "Iridium and Ruthenium Complexes of N-Heterocyclic Carbene- and Pyridinol-Derived Chelates as Catalysts for Aqueous Carbon Dioxide Hydrogenation and Formic Acid Dehydrogenation: The Role of the Alkali Metal", Organometallics, 2017, 36, 1091-1106.
Siek, et al., "The Synthesis of Biomimetic Zinc Complexes for CO2 Activation and the Influence of Steric Changes in the Ttz Ligands (Ttz = Tris(triazolyl)borate)", Eur. J. Inorg. Chem, 2016, 2495-2507, in Scorpionates special issue. dx.doi.org/10.1002/ejic.201500819.
Siek, et al., "Electrochemical Reduction of Ttz Copper(II) Complexes in the Presence and Absence of Protons: Processes Relevant to Enzymatic Nitrite Reduction. (TtzR,R' = tris(3-R, 5-R' -1, 2, 4-triazolyl)borate)" Inorganica Chimica Acta, 2017, 459, 80-86. dx.doi.org/10.1016/j.ica.2017.01.021.
Smieja, et al., "Re(bipy-tBu)(CO)3C1—improved Catalytic Activity for Reduction of Carbon Dioxide: IR-Spectroelectrochemical and Mechanistic Studies." Inorganic Chemistry 2010, 49 (20), 9283-9289.
Suzuki, et al., "Direct assembly synthesis of metal complex-semiconductor hybrid photocatalysts anchored by phosphonate for highly efficient CO2 reduction." Chemical Communications 2011, 47 (30), 8673-8675.
Takeda, et al., "Photocatalytic CO2 reduction using a Mn complex as a catalyst." Chemical Communications 2014, 50 (12), 1491-1493.
Tamaki, et al., "Photocatalytic CO2 reduction with high turnover frequency and selectivity of formic acid formation using Ru(II) multinuclear complexes." Proceedings of the National Academy of Sciences 2012, 109 (39), 15673-15678.
Tamaki, et al., "Supramolecular photocatalysts constructed with a photosensitizer unit with two tridentate ligands for CO2 reduction." Faraday Discussions 2017, 198, 319-35.
Therrien, et al., "Electrocatalytic Reduction of CO2 with Palladium Bis-N-heterocyclic Carbene Pincer Complexes", Inorg. Chem., 2014, 53, 12962-12972.
Therrien, et al., "Polyannulated Bis(N-heterocyclic carbene)palladium Pincer Complexes for Electrocatalytic CO2 Reduction" Inorg. Chem., 2015, 54, 11721-11732.
Thoi, et al., "Nickel N-heterocyclic carbene-pyridine complexes that exhibit selectivity for electrocatalytic reduction of carbon dioxide over water", Chem. Commun., 2011, 47, 6578-6580.
Thoi, et al., "Visible-light photoredox catalysis: selective reduction of carbon dioxide to carbon monoxide by a nickel N-heterocyclic carbene-isoquinoline complex", J. Am. Chem. Soc., 2013, 135, 14413-14424.
Tokmic, et al., "Well-Defined Cobalt(I) Dihydrogen Catalyst: Experimental Evidence for a Co(I)/Co(III) Redox Process in Olefin Hydrogenation", J. Am. Chem. Soc., 2016, 138, 11907-11913.
Underwood, A. J. V., "Industrial Synthesis of Hydrocarbons from Hydrogen and Carbon Monoxide." Industrial & Engineering Chemistry 1940, 32 (4), 449-454.
Wang, et al., "Second-coordination-sphere and electronic effects enhance iridium(III)-catalyzed homogeneous hydrogenation of carbon dioxide in water near ambient temperature and pressure", Energy Environ. Sci., 2012, 5, 7923-7926.
Werkmeister, et al., "Pincer-Type Complexes for Catalytic (De)Hydrogenation and Transfer (De)Hydrogenation Reactions: Recent Progress", Chem.-Eur. J., 2015, 21, 12226-12250.
Winter, et al., "Thermal conversion of a pyridine-bridged bisdithiazolyl radical to a zwitterionic bisdithiazolopyridone." Chemical Communications 2010, 46 (25), 4496-4498.
Xiaoding, et al., "Mitigation of CO2 by Chemical Conversion: Plausible Chemical Reactions and Promising Products." Energy & Fuels 1996, 10 (2), 305-325.
Yu, et al., "High-Activity Iron Catalysts for the Hydrogenation of Hindered, Unfunctionalized Alkenes", ACS Catal., 2012, 2, 1760-1764.
Yuan, et al., "Visible-Light-Driven H2 Generation from Water and CO2 Conversion by Using a Zwitterionic Cyclometalated Iridium(III) Complex." Chemistry—A European Journal 2011, 17 (46), 12891-12895.
Yui, et al., "Photocatalytic reduction of CO(2): from molecules to semiconductors." Topics in current chemistry 2011, 303, 151-84.
Zhang, et al., "A Biomimetic Copper Water Oxidation Catalyst with Low Overpotential", J. Am. Chem. Soc., 2014, 136, 273-281.
James D. Cope et al., Electrocatalytic reduction of CO2 with CCC-NHC pincer nickel complexes, Chem. Commun., 2017, 53, 9442-9445.

\* cited by examiner

LIGHT DRIVEN METAL PINCER PHOTOCATALYSTS FOR CARBON DIOXIDE REDUCTION TO CARBON MONOXIDE

CROSS-REFERENCE TO RELATED APPLICATIONS

This application claims the benefit of and priority to U.S. Provisional Application No. 62/558,669 filed on Sep. 14, 2017, the disclosure of which is expressly incorporated herein by reference in its entirety.

STATEMENT ACKNOWLEDGING OF GOVERNMENT SUPPORT

This invention was made with government support under grant no. OIA-1539035 awarded by the National Science Foundation. The government has certain rights in the invention.

BACKGROUND

Solar or photoelectric powered catalytic conversion of $CO_2$ to usable fuel precursors (e.g., CO, HCOOH, $CH_4$) would allow for the storage of solar energy for usage in the dark and for transportation. Solar fuels are potentially renewable and sustainable, if the problem of designing a highly active catalyst can be overcome (M. Robert, *ACS Energy Lett.*, 2016, 1, 281-282). Direct electrocatalytic reduction of $CO_2$ to $CO_2^-$. is an energetically demanding process (−1.97 V vs. NHE in DMF; −1.99 V vs. NHE in $H_2O$ at pH 7) (Id.). In practice, proton coupled electron transfer (PCET) can lower the barrier to CO formation ($CO_2$+2e−+ $2H^+ \rightarrow CO+H_2O$ at −0.53 V vs. NHE in DMF; −0.52 V vs. NHE in $H_2O$ at pH 7). Importantly, PCET processes can be accelerated by having protic ligands near the metal center in the catalyst (T. Zhang, et al., *J. Am. Chem. Soc.*, 2014, 136, 273-281). The catalyst also lowers the activation barrier for this reaction and can select for CO formation vs. other multi-electron products (HCOOH at −0.61 V, HCHO at −0.48 V, $CH_3OH$ at −0.38 V and $CH_4$ at −0.24 V vs NHE at pH 7) (E. E. Benson, et al., *Chem. Soc. Rev.*, 2009, 38, 89-99).

Ruthenium based catalysts, such as benchmark $[Ru(bpy)_2(CO)_2]^{2+}$ (1) where bpy=2,2'bipyridine, most commonly use N,N donor diimine ligands and are reported to reduce $CO_2$ to predominantly HCOOH (H. Ishida, et al., *J. Chem. Soc. Dalton Trans.*, 1990, 0, 2155-2160; H. Ishida, et al., *Organometallics*, 1987, 6, 181-186; H. Ishida, et al., *Inorg. Chem.*, 1990, 29, 905-911; J.-M. Lehn et al., *J. Organomet. Chem.*, 1990, 382, 157-173; Y. Tamaki, et al., *Proc. Natl. Acad. Sci.*, 2012, 109, 15673-15678; T. M. Suzuki, et al., *Chem. Commun.*, 2011, 47, 8673-8675; S. Sato, et al., *J. Am. Chem. Soc.*, 2011, 133, 15240-15243). Through the use of a photosensitizer (PS), these complexes can achieve high durability and reactivity for the photocatalytic reduction of $CO_2$. Typically, the PS is first photoexcited to generate a reducing species (PS*), which accepts an electron from a sacrificial donor (SD). The reduced PS, $PS^-$, can then transfer an electron to the Ru catalyst, which may interact with $CO_2$ before accepting a second electron to reduce $CO_2$ to CO with concomitant water formation (FIG. 1). For example, $[Ru(bpy)_2(CO)_2]^{2+}$ (1) facilitates $CO_2$ reduction to a mixture of formate and CO with $[Ru(bpy)_3]^{2+}$ as the photosensitizer with >100 TON.

Through the use of a photosensitizer (PS), nickel complexes are also known to photocatalytically reduce $CO_2$ (V. S. Thoi, et al., *J. Am. Chem. Soc.*, 2013, 135, 14413-14424; M. F. Kuehnel, et al., *J. Am. Chem. Soc.*, 2017, DOI: 10.1021/jacs.7b00369, DOI: 10.1021/jacs.1027b00369; D. Hong, et al., *J. Am. Chem. Soc.*, 2017, 139, 6538-6541). Typically, the PS is first photoexcited to generate a reducing species, which accepts an electron from a sacrificial donor (SD, FIG. 1). The reduced PS then can transfer an electron to the Ni catalyst, which may interact with $CO_2$ before accepting a second electron to reduce $CO_2$ to CO with concomitant water formation when a proton source is available.

Unfortunately, it is difficult to predict when a change in a remote substituent effect will greatly impact catalytic rates or catalyst longevity. This is especially true in the area of $CO_2$ reduction by both electrochemical and photochemical methods. Hydroxy (OH) groups (via covalently attached phenols) have been added to iron porphyrin-based catalysts and have resulted in improved turnover frequencies (TOFs) for electrocatalytic $CO_2$ reduction due to an increased local concentration of protons (C. Costentin, et al., *Acc. Chem. Res.*, 2015, 48, 2996-3006; C. Costentin, et al., *Science*, 2012, 338, 90-94). However, in the case of photocatalytic $CO_2$ reduction using these same phenol substituted iron complexes, these catalysts were prone to decomposition (J. Bonin, et al., *ChemCatChem*, 2014, 6, 3200-3207). Additionally, iron porphyrins in which the phenols were replaced with quaternary ammonium derivatives did serve as active photocatalysts to produce both methane and CO (H. Rao, et al., *Chem. Commun.*, 2017, 53, 2830-2833). Similarly, a phenol group on the ligand is beneficial in electrocatalytic $CO_2$ reduction with a manganese(I) catalyst; again the OH group is thought to facilitate proton transfer and play a key mechanistic role (J. Agarwal, et al., *Inorg. Chem.*, 2015, 54, 5285-5294). In contrast, the use of the 4,4'- or 6,6'-dihydroxybipyridine (dhbp) ligand with Re(I) or Ru(II) complexes (D. C. Marelius, et al., *Eur. J. Inorg. Chem.*, 2014, 2014, 676-689) has illustrated that in this specific case, proximal hydroxyl groups are detrimental towards electrocatalytic $CO_2$ reduction, and in fact the 6,6'-dhbp complexes only gives minimal activity (TON=1 or less) with competing decomposition (L. Duan, et al., *Inorg. Chem.*, 2016, 55, 4582-4594; G. F. Manbeck, et al., *J. Phys. Chem. B*, 2015, DOI: 10.1021/jp511131x, 7457-7466). In contrast to this, proximal OH groups (in bidentate (D. L. Gerlach, et al., *Inorg. Chem.*, 2014, 53, 12689-12698; J. DePasquale, et al., *Inorg. Chem.*, 2013, 52, 9175-9183; WO2013033018A2; I. Nieto, et al., *Organometallics*, 2011, 30, 6339-6342) and tridentate (C. M. Moore, et al., *ACS Catal.*, 2016, 6, 1981-1990; A. R. Sahoo, et al., *Catal. Sci. Technol.*, 2017, 7, DOI: 10.1039/c1037cy00932a) ligands) are generally beneficial in metal catalysts for the hydrogenation of $CO_2$ (S. Siek, et al., *Organometallics*, 2017, 36, 1091-1106; D. L. Gerlach, et al., *Inorg. Chim. Acta*, 2017; W.-H. Wang, et al., *Energy Environ. Sci.*, 2012, 5, 7923-7926; J. F. Hull, et al., *Nature Chem.*, 2012, 4, 383-388) and other substrates.

Given the importance of converting $CO_2$ into fuel precursors like CO, HCOOH, and $CH_4$, new catalysts that have improved selectivity, activity, and durability are needed. But as noted, it is difficult to predict which catalyst and catalytic systems will achieve these aims. What are disclosed herein are compounds, methods, and systems that address these and other needs.

SUMMARY

In accordance with the purposes of the disclosed materials and methods, as embodied and broadly described herein, the disclosed subject matter, in one aspect, relates to compounds, compositions and methods of making and using compounds and compositions. In specific aspects, the disclosed subject matter relates to compounds having Formula I

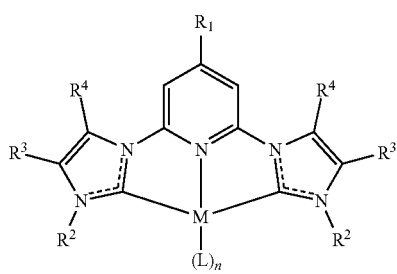

I wherein $R^1$ is OH, $O^-$, halogen, amine, alkyl, alkenyl, alkynyl, aryl, heteroaryl, alkoxy, aryloxy, cycloalkyl, or cycloalkenyl, wherein $R^1$ is optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, phosphonyl, or photosensitizer; each $R^2$ is, independent of the other, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol; each $R^3$ and $R^4$ are, independent of the other, hydrogen, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol, or $R^3$ and $R^4$ combine together with the atoms to which they are attached to form a cycloalkyl, cycloheteroaryl, aryl, or heteroaryl; M is Ni, Ru, Fe, Co, or Ir; each L is, independent of any other, Cl, Br, $CH_3CN$, DMF, $H_2O$, bipyridine, phenylpyridine, $CO_2$, or a CNC-pincer ligand; and n is 1, 2, or 3. Also disclosed are catalytic systems comprising compounds of Formula I, a photosensitizer, an electron donor, and optional solvent. Methods of using the disclosed catalyst systems to photocatalytically convert $CO_2$ to CO are also disclosed.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
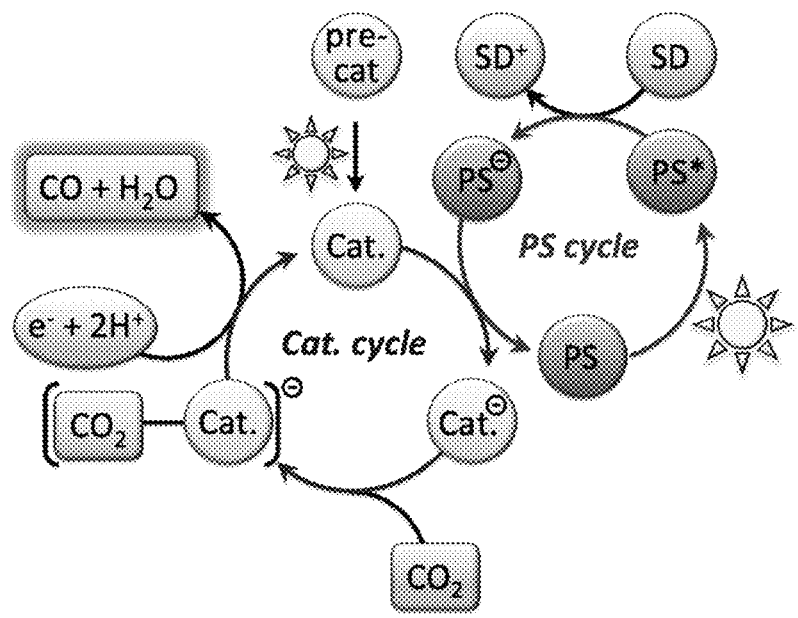
FIG. 1 is an illustration of a photocatalytic $CO_2$ reduction. PS is photosensitizer, SD is sacrificial donor, and Cat is catalyst.

The materials, compounds, compositions, and methods described herein may be understood more readily by reference to the following detailed description of specific aspects of the disclosed subject matter, the Figures, and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

Chemical Definitions

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OZ^1$ where $Z^1$ is alkyl as defined above.

The term "alkenyl" as used herein is a hydrocarbon group of from 2 to 24 carbon atoms with a structural formula containing at least one carbon-carbon double bond. Asymmetric structures such as ($Z^1Z^2$)C=C($Z^3Z^4$) are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, thiol, or phosphonyl, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described below.

The term "aryl" as used herein is a group that contains any carbon-based aromatic group including, but not limited to, benzene, naphthalene, phenyl, biphenyl, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, or phosphonyl, as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C=O, which is also referred to herein as a "carbonyl."

The terms "amine" or "amino" as used herein are represented by the formula —$NZ^1Z^2$, where $Z^1$ and $Z^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above. "Amido" is —C(O)$NZ^1Z^2$.

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)$Z^1$ or —C(O)O$Z^1$, where $Z^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1$O$Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1$C(O)$Z^2$, where $Z^1$ and $Z^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "cyano" as used herein is represented by the formula —CN.

The term "nitro" as used herein is represented by the formula —$NO_2$.

The term "phosphonyl" is used herein to refer to the phospho-oxo group represented by the formula —P(O)(O$Z^1$)$_2$, where $Z^1$ can be absent, hydrogen, an alkyl, alkenyl, alkynyl, aryl, heteroaryl, cycloalkyl, or cycloalkenyl.

The term "silyl" as used herein is represented by the formula —Si$Z^1Z^2Z^3$, where $Z^1$, $Z^2$, and $Z^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2Z^1$, where $Z^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfonylamino" or "sulfonamide" as used herein is represented by the formula —S(O)$_2$NH—.

The term "thiol" as used herein is represented by the formula —SH.

The term "thio" as used herein is represented by the formula —S—.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Dashed lines in a chemical structure are used to indicate that a bond may be present or absent, or that it may be a delocalized bond between the indicated atoms.

Reference will now be made in detail to specific aspects of the disclosed materials, compounds, compositions, articles, and methods, examples of which are illustrated in the accompanying Examples and Figures.

Compounds

N-heterocyclic carbene (NHC) and pyridine rings have been combined to make bidentate, tridentate pincer, and tetradentate ligands for metal catalysts that are highly active for $CO_2$ reduction (V. S. Thoi, et al., *J. Am. Chem. Soc.*, 2013, 135, 14413-14424; V. S. Thoi et al., *Chem. Commun.*, 2011, 47, 6578; J. Agarwal, et al., *Angew. Chem. Int. Ed.*, 2014, 53, 5152-5155; N. P. Liyanage, et al., *Inorg. Chem.*, 2016, 55, 6085-6094; A. J. Huckaba, et al., *Inorg. Chem.*, 2016, 55, 682) and other reactions. Focusing on the group 10 metals (J. A. Therrien, et al., *Inorg. Chem.*, 2015, 54, 11721-11732; J. A. Therrien, et al., *Inorg. Chem.*, 2014, 53, 12962-12972), tetradentate NCCN ligands bind to Ni(II) and form highly efficient photocatalysts for $CO_2$ reduction to CO. NHC-based CNC-pincer ligands desirably combine a strong σ-donor for increased electron density at the metal center where reduction is facilitated with moderate π-acceptor properties at the NHC and pyridine rings for stabilizing reduced catalyst states before $CO_2$ reduction. Specific to the CNC-pincer architecture, the central pyridine ring leads to favorable chelate ring sizes with appropriate angles for stabilized metal centers with an easily opened reaction site with the proper choice of monodentate metal ligand (S. Grindemann, et al., *Organometallics*, 2001, 20, 5485-5488; P. Cao, et al., *Organometallics*, 2012, 31, 921-929; A. J. Arduengo, *Acc. Chem. Res.*, 1999, 32, 913-921). Higher obtainable thermal stabilities have produced more durable homogenous catalysts for several types of reactions (R. P. Yu, et al., *ACS Catal.*, 2012, 2, 1760-1764; A. A. Danopoulos, et al., *Chem. Commun.*, 2005, 0, 784-786; M. Poyatos, et al., *Organometallics*, 2003, 22, 1110-1114; S. Werkmeister, et al., *Chem.-Eur. J.*, 2015, 21, 12226-12250; P. Kang, et al., *Top. Catal.*, 2014, 58, 30-45; D. Milstein, *Top. Catal.*, 2010, 53, 915-923; K. Tokmic, et al., *J. Am. Chem. Soc.*, 2016, 138, 11907-11913; J. A. Therrien, et al., *Inorg. Chem.*, 2015, 54, 11721-11732; G. Bauer et al., *Inorg. Chem. Front.*, 2016, 3, 741-765).

Separately, NHC rings and pyridinol derived rings (e.g. 4,4'- and 6,6'-dihydroxybipyridine) (D. L. Gerlach, et al., *Inorg. Chem.*, 2014, 53, 12689-12698; J. DePasquale, et al., *Inorg. Chem.*, 2013, 52, 9175-9183; E. T. Papish and I. Nieto, International Patent Application Publication WO2013033018A2, 2013; I. Nieto, et al., Organometallics, 2011, 30, 6339-6342; D. C. Marelius, et al., *Eur. J. Inorg. Chem.*, 2014, 2014, 676-689) have found application as ligands in metal catalysts for $CO_2$ hydrogenation using chemical ($H_2$) (J. F. Hull, et al., *Nature Chem.*, 2012, 4, 383-388; S. Siek, et al., Organometallics, 2017, 36, 1091-1106; D. L. Gerlach, et al., *Inorg. Chim. Acta*, 2017, 466, 442-450; Y. M. Badiei, et al., *Inorg. Chem.*, 2013, 52, 12576-12586), electrochemical (L. Duan, et al., *Inorg. Chem.*, 2016, 55, 4582-4594; G. F. Manbeck, J. T. Muckerman, D. J. Szalda, Y. Himeda and E. Fujita, *The Journal of Physical Chemistry B*, 2015, DOI: 10.1021/jp511131x, 7457-7466; J. Agarwal, et al., *Angew. Chem. Int. Ed.*, 2014, 53, 5152-5155), and photochemical methods (V. S. Thoi, et al., *J. Am. Chem. Soc.*, 2013, 135, 14413-14424; V. S. Thoi et al., *Chem. Commun.*, 2011, 47, 6578). However, thus far, no one has experimentally combined NHC and pyridinol derived rings on a pincer scaffold (A. A. Danopoulos, et al., *Chem. Eur. J.*, 2009, 15, 5491-5502).

Disclosed herein are modified CNC-pincer ligands for photocatalytic conversion of $CO_2$ to CO. The CNC-pincer ligands disclosed herein have Formula II

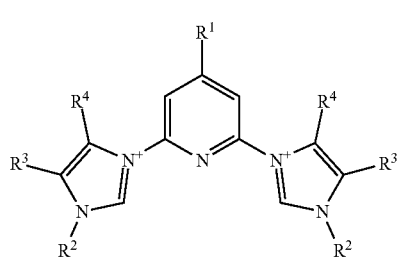

wherein $R^1$ is OH, O⁻, halogen, amine, alkyl, alkenyl, alkynyl, aryl, heteroaryl, alkoxy, aryloxy, cycloalkyl, or cycloalkenyl, wherein $R^1$ is optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, phosphonyl, or photosensitizer. In specific examples, $R^1$ is OH, O⁻, halogen, or optionally substituted amine, alkyl, aryl, alkoxy, or aryloxy, e.g., $OC_{1-12}$ alkyl such as $OCH_3$. In other examples, $R^1$ can be methoxy substituted with $CO_2H$. In further examples, $R^1$ can be alkyl, aryl, alkoxy, or aryloxy substituted with a photosensitizer as described herein. Each $R^2$ can be, independent of the other, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol. In specific examples, each $R^2$ can be optionally substituted alkyl or aryl. In specific examples, both $R^2$ are methyl. Each $R^3$ and $R^4$ can be, independent of the other, hydrogen, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol, or $R^3$ and $R^4$ can combine together with the atoms to which they are attached to form a cycloalkyl, cycloheteroaryl, aryl, or heteroaryl. In specific examples, both $R^3$ and $R^4$ can combine together with the atoms to which they are attached to form a cycloalkyl, cycloheteroaryl, aryl, or heteroaryl, preferably an aryl or heteroaryl. In other specific examples, both $R^3$ and $R^4$ can be hydrogen. In more specific examples, the CNC-pincer ligands disclosed herein have Formula II-A

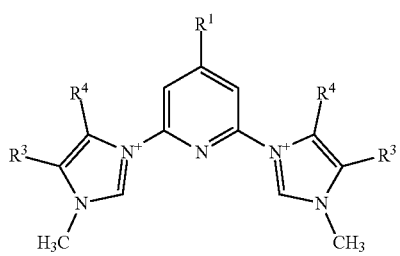

wherein $R^1$ is as defined herein, e.g., OH, O⁻, halogen, optionally substituted amine, alkyl, aryl, alkoxyl, or aryoxy; and $R^3$ and $R^4$ are as defined herein, e.g., $R^3$ and $R^4$ can be hydrogen or combine together with the atoms to which they are attached to form a cycloalkyl, cycloheteroaryl, aryl, or heteroaryl, preferably an aryl or heteroaryl.

Also disclosed herein are compounds comprising one or more of these CNC-pincer ligands on a metal center. For example, the CNC-pincer ligands can be affixed to Ru, Ni, Fe, Co, or Ir metal centers. Thus, also disclosed herein are Ru, Ni, Fe, Co, and Ir catalysts comprising the disclosed CNC-pincer ligands. These ligands can modulate electron density at the metal center with and without an electron donor group (O⁻) at the para (to N) position to greatly enhance the electron donor properties for the pyridine ring (A. A. Danopoulos, et al., *Chem. Eur. J.*, 2009, 15, 5491-5502). As shown herein, this change can convert inactive photocatalytic systems into active photocatalytic systems.

Disclosed herein are compounds having Formula I

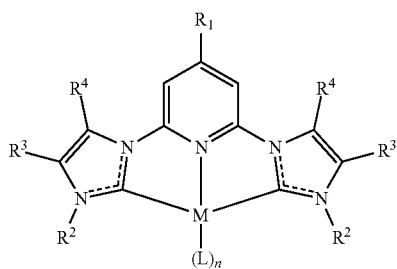

wherein, $R^1$ is OH, O⁻, halogen, amine, alkyl, alkenyl, alkynyl, aryl, heteroaryl, alkoxy, aryloxy, cycloalkyl, or cycloalkenyl, wherein $R^1$ is optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, thiol, phosphonyl, or photosensitizer; each $R^2$ is, independent of the other, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol; $R^3$ and $R^4$ can be, independent of the other, hydrogen, alkyl, alkenyl, alkynyl, aryl, or heteroaryl optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol, or $R^3$ and $R^4$ can combine together with the atoms to which they are attached to form a cycloalkyl, cycloheteroaryl, aryl, or heteroaryl; M is Ni, Ru, Fe, Co, or Ir; each L is independently chosen from Cl, Br, $CH_3CN$, DMF, $H_2O$, bipyridine, phenylpyridine, $CO_2$, and a CNC-pincer ligand (e.g., Formula II); and n is 1, 2, or 3.

In specific examples, M can be Ni. In other examples, M can be Ru. In still other examples, M can be Fe. In yet further examples, M can be Co. In other examples, M can be Ir.

In specific examples, $R^1$ is OH, O—, halogen, optionally substituted amine, alkyl, aryl, alkoxy, or aryloxy. In specific examples, $R^1$ is $OC_{1-12}$alkyl, e.g., $OCH_3$. In other examples $R^1$ is methoxy substituted with $CO^2H$. In still further examples, $R^1$ is amine, alkyl, aryl, alkoxy, aryloxy substituted with a photosensitizer as described herein. In some examples of the Formulas described herein, $R^1$ is not H.

In specific examples, each $R^2$ can be optionally substituted alkyl or aryl. In specific examples, both $R^2$ are methyl.

In some examples, both $R^3$ and $R^4$ can combine together with the atoms to which they are attached to form a cycloalkyl, cycloheteroaryl, aryl, or heteroaryl. In specific examples, both $R^3$ and $R^4$ can combine together with the atoms to which they are attached to form an aryl or heteroaryl. In other specific examples, $R^3$ and $R^4$ can be the same or different. For example, both $R^3$ and $R^4$ can be hydrogen.

In specific examples, compounds disclosed herein can have Formula I-A

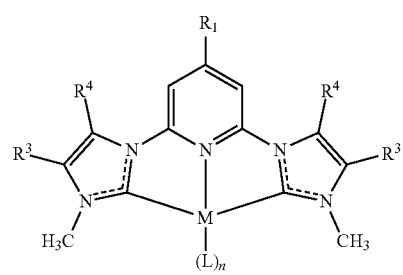

Compounds of Formula I or I-A can exist as ions with a +, 2+, or 3+ charge. As such, disclosed herein are compounds wherein Formula I or I-A is associated with one or more counteranions. Examples of suitable counteranions include I—, Br—, $CF_3COO^-$, $BF_4^-$, and $PF_6^-$.

In certain examples, L is Cl or Br. In particular, at least one L can be Cl. In other examples, one or more L can be $CH_3CN$. In other examples, one or more L can be dimethylformamide (DMF). In other examples, one or more L can be $H_2O$. In other examples, one or more L can be bipyridine or phenylpyridine. In further examples, L can be a CNC-pincer ligand of Formula II or II-A.

In specific examples, disclosed herein are the following nickel compounds.

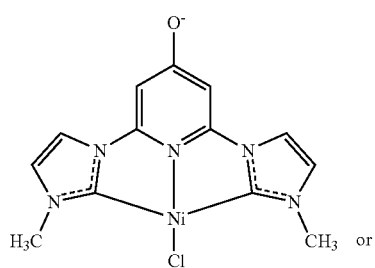

or

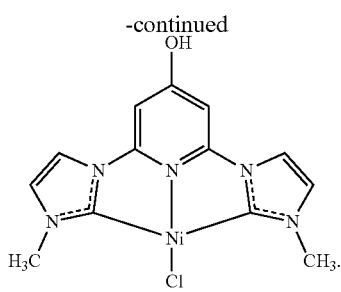

In specific examples, disclosed herein are the following ruthenium compounds

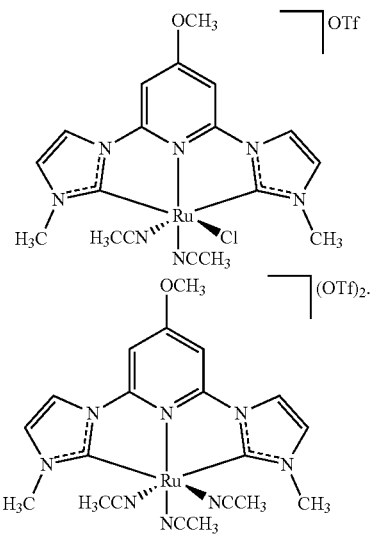

The OTf counteranions can be replaced by any of the counteranions disclosed herein.

Further examples of ruthenium compounds are

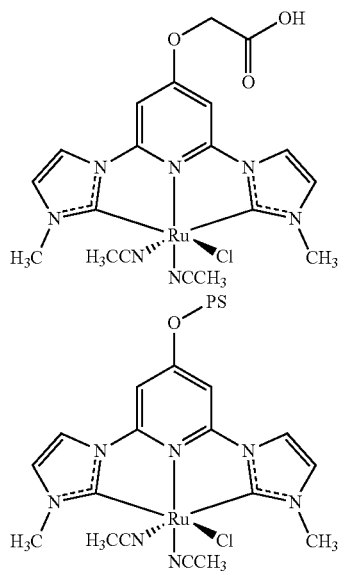

where PS is a photosensitizer.

Even further examples of ruthenium compounds are

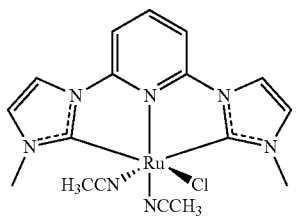

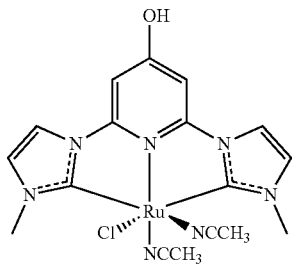

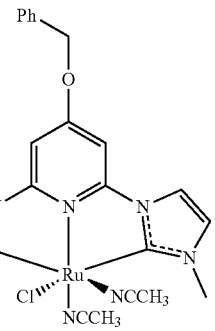

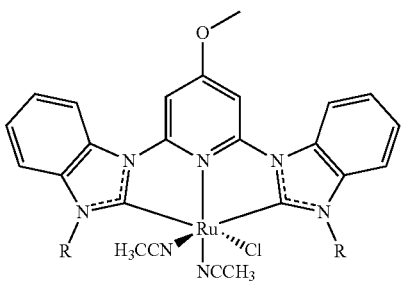

and

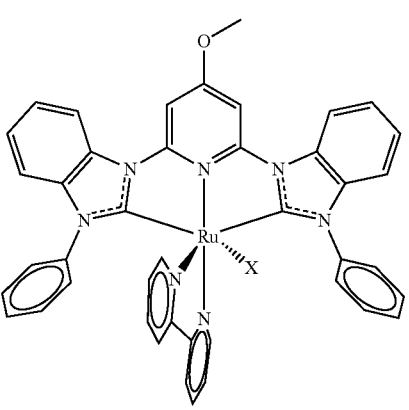

In specific examples, disclosed herein are the following iron and cobalt compounds.

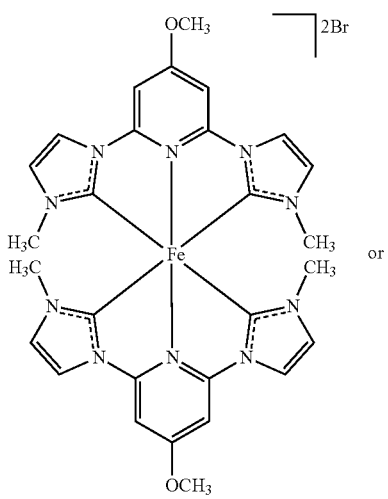

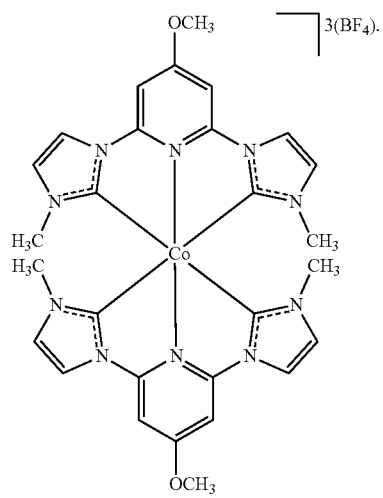

The Br and BF$_4$ counteranions can be substituted with any of the counteranions disclosed herein.

In further examples, R$^1$ in Formula I is linked to a photosensitizer PS. The photosensitizer can be any of those disclosed herein, e.g., the photosensitizer can be Ru(bpy)$_3$, Ir(ppy)$_3$, Cu(dmbpy)$_2$, Os(bpy)$_3$, Ru(phen)$_3$, or a derivative or a mixture thereof. In some examples, the PS can be linked to multiple R$^1$ groups of multiple compounds of Formula I (e.g., (Formula I)$_{1-3}$PS. Some specific examples of such compounds are:

I-B

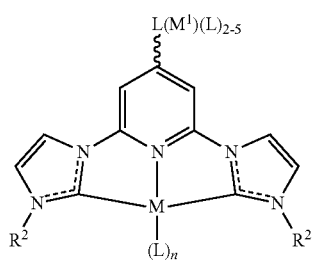

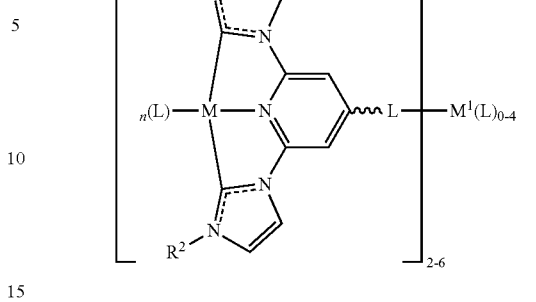

wherein R$^2$, M, L, and n are as defined herein, M$^1$ is Ir, Ru, Os, Cu, Fe, Ni, or Co, and the line ∿ represents an alkyl or alkoxy linker of from 1-6 atoms in length.

Specific examples of compounds disclosed herein are

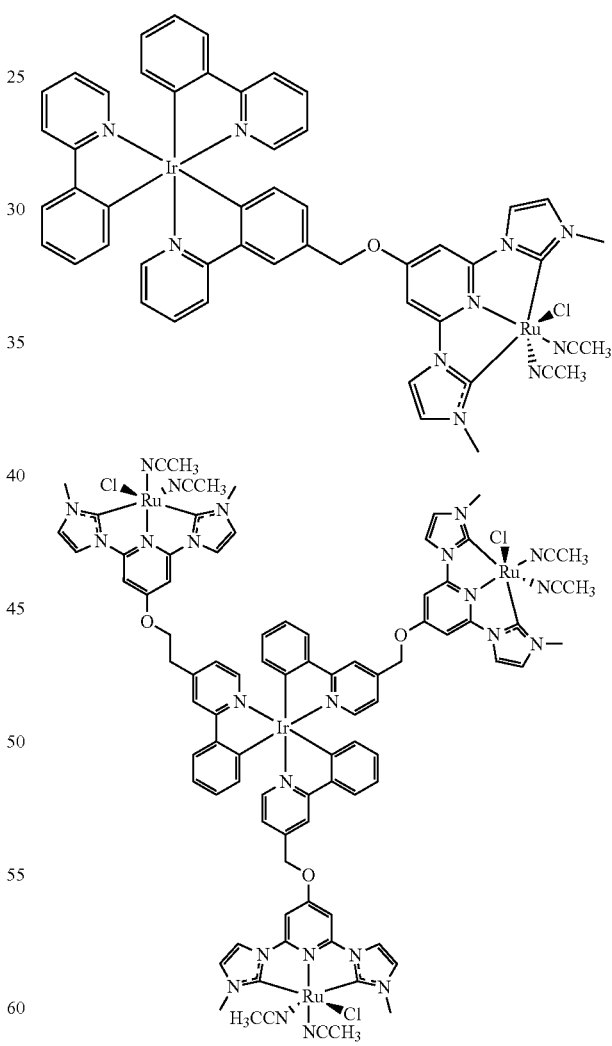

In still further examples, the compounds disclosed herein can be anchored to a substrate. Examples of suitable substrates can include metal and metal oxide semiconductors such as TiO$_2$, NiO, SnO$_2$, ZnO. Further examples of substrates include, without limitation, glass, metal-coated glass, polymer materials, metal-coated polymers, metal, metal alloy, quartz, paper, transparent conducting material, nanowires, and nanotubes. Examples of polymer materials are polyalkylenes, polyesters, polyamides, polycarbonates, and polyalkoxyls. In specific examples, the substrate can be Mo-coated glass, Au-coated glass, Ni-coated glass, indium tin oxide-coated glass, Mo-coated polyethylene terephthalate, Au-coated polyethylene terephthalate, Ni-coated polyethylene terephthalate, indium tin oxide-coated polyethylene terephthalate, non-woven indium tin oxide, or any other suitable material. In one aspect, a substrate can be electrically conductive, for example, to carry charge to or from a film or layer of nanocrystals. In specific examples, the substrate can be a metal or metal coated substrate.

Anchoring of the disclosed compounds to a substrate can occur through substituent $R^1$ (referring to Formula I as I-A). For example, $R^1$ can be a halogen, amine, alkyl, alkenyl, alkynyl, aryl, heteroaryl, alkoxy, aryloxy, cycloalkyl, or cycloalkenyl substituted with an anchoring substituent such as $CO_2H$, $PO_3H_2$, $PO_3H^-$, $PO_3^{2-}$, $Si(OMe)_3$, $Si(OEt)_3$, or $SO_3^-$, which can attach to (form a bond with) a substrate as described herein. Alternatively, $R^1$ can be an alkyl, alkenyl, alkynyl, aryl, heteroaryl, alkoxy, aryloxy, cycloalkyl, or cycloalkenyl substituted with a photosensitizer as disclosed herein, and the photosensitizer can be substituted with an anchoring substituent such as $CO_2H$, $PO_3H_2$, $PO_3H^-$, $PO_3^{2-}$, $Si(OMe)_3$, $Si(OEt)_3$, or $SO_3^-$, which can attach to (form a bond with) a substrate as described herein. Additional anchoring substituents can be on R1 include OH, SH, amino, silyl, esters, aldehydes, and the like.

Some specific examples of compounds wherein a compound of Formula I is linked at $R^1$ to a photosensitizer that is linked to an anchoring moiety, e.g., $CO_2H$, $PO_3H_2$, $PO_3H^-$, $PO_3^{2-}$, $Si(OMe)_3$, $Si(OEt)_3$, or $SO_3^-$, include

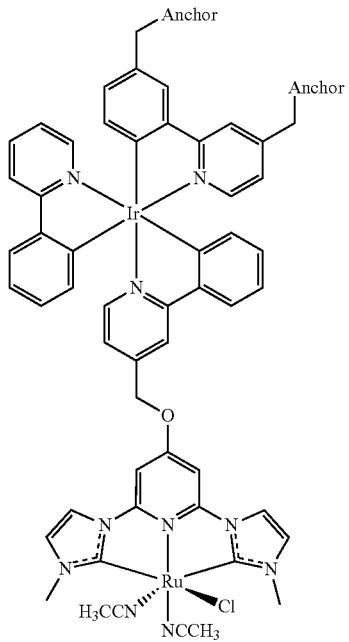

-continued

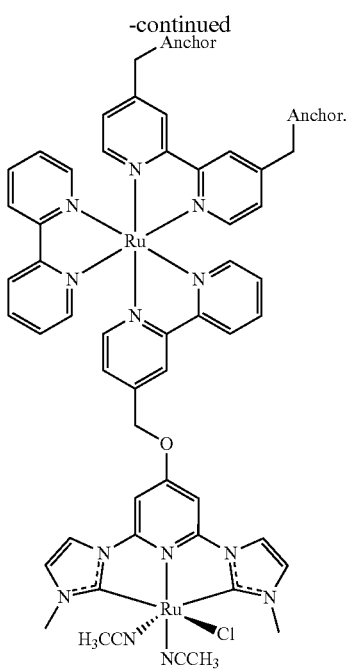

Catalytic Systems

Also disclosed herein are catalytic systems. The disclosed catalytic systems comprise any one or more of the catalyst compounds disclosed herein, a photosensitizer, and an electron donor (sacrificial donors).

Examples of suitable photosensitizers include wherein the photosensitizer is $Ru(bpy)_3$, $Ir(ppy)_3$, $Cu(dmbpy)_2$, $Os(bpy)_3$, $Ru(phen)_3$, or a derivative or a mixture thereof. In further examples, the photosensitizer can be $Ir(X—Y)_3$ where X—Y is a monoanionic ligand (often binding to the metal through C,N). Other photosensitizers include $Ru(N, N)_3$ where N,N is a diimine, e.g. 1,10-phenanthroline. Further examples of photosensitizers include porphyrins; benzoporphyrins; azabenzoporphyrine; napthoporphyrin; phthalocyanine; polycyclic aromatic hydrocarbons such as perylene, perylene diimine, pyrenes, azo dyes, xanthene dyes, boron dipyoromethene, aza-boron dipyromethene, cyanine dyes, metal-ligand complex such as bipyridine, bipyridyls, phenanthroline, coumarin, and acetylacetonates of ruthenium and iridium; acridine, oxazine derivatives such as benzophenoxazine; aza-annulene, squaraine; 8-hydroxyquinoline, polymethines, carbostyril; terbium complex; inorganic phosphor; ionophore such as crown ethers affiliated or derivatized dyes; or combinations thereof. Other examples of suitable photosensitizers include Pd (II) octaethylporphyrin; Pt (II)-octaethylporphyrin; Pd (II) tetraphenylporphyrin; Pt (II) tetraphenylporphyrin; Pd (II) meso-tetraphenylporphyrin tetrabenzoporphine; Pt (II) meso-tetrapheny metrylbenzoporphyrin; Pd (II) octaethylporphyrin ketone; Pt (II) octaethylporphyrin ketone; Pd (II) meso-tetra(pentafluorophenyl)porphyrin; Pt (II) meso-tetra (pentafluorophenyl) porphyrin; Ru (II) tris(4,7-diphenyl-1,10-phenanthroline) (Ru (dpp)₃); Ru (II) tris(1,10-phenanthroline) (Ru(phen)₃), tris(2,2'-bipyridine)rutheniumn (II) chloride hexahydrate (Ru(bpy)₃); erythrosine B; fluorescein; eosin; iridium (III) ((N-methyl-benzimidazol-2-yl)-7-(diethylamino)-coumarin)); indium (III) ((benzothiazol-2-yl)-7-(diethylamino)-coumarin))-2-(acetylacetonate); 3-coordination iridium complex having on a ligand 2,2'-bipyridine-4,4'-dicarboxylic acid, factris(2-phenylpyridine)iridium (Ir(Ppy)₃), 8-hydroxyquinoline aluminum (Alq3), tris(4-methyl-8-quinolinolate)aluminum (III) (Almq3), 8-hydroxyquinoline zinc (Znq2), (1,10-phenanthroline)-tris-(4,4,4-trifluoro-1-(2- thienyl)-butane-1,3-dionate), europium (III) (Eu(TTA)₃ (phen)), 2,3,7,8,12,13,17,18-octaethyl-21H, and 23H-porphin platinum (II); Lumogen dyes; Macroflex fluorescent red; Macrolex fluorescent yellow; Texas Red; rhodamine B; rhodamine 6G; sulfur rhodamine; m-cresol; thymol blue; xylenol blue; cresol red; chlorophenol blue; bromocresol green; bromcresol red; bromothymol blue; Cy2; a Cy3; a Cy5; a Cy5.5; Cy7; 4-nitirophenol; alizarin; phenolphthalein; o-cresolphthalein; chlorophenol red; calmagite; bromoxylenol; phenol red; neutral red; nitrazine; 3,4,5,6-tetrabromphenolphtalein; congo red; fluorescein; eosin; 2',7'-dichlorofluorescein; 5(6)-carboxy-fluorecsein; carboxynaphtofluorescein; 8-hydroxypyrene-1,3,6-trisulfonic acid; semi-naphthorhodafluor; semi-naphthofluorescein; tris (4,7-diphenyl-1,10-phenanthroline) ruthenium (II) dichloride; (4,7-diphenyl-1,10-phenanthroline) ruthenium (II) tetraphenylboron; platinum (II) octaethylporphyin; dialkylcarbocyanine; and dioctadecylcycloxacarbocyanine; Cu(6,6'-dimethylbipyridine), 9-cyanoanthracene, derivatives or combinations thereof.

As noted herein, the photosensitizer can also be bound to the compounds of Formula I or I-A through substituent $R^1$. The photosensitizer can also comprise an anchoring moiety as disclosed herein to attached the catalyst to a substrate.

Examples of suitable electron donors include alcohols and amines. For examples, suitable electron donors include trimethylamine, triethanolamine (TEOA), (1,3-dimethyl-2-phenyl-2,3-dihydro-1H-benzo[d]imidazole) (BIH), 1-benzyl-1,4-dihydropyridine-3-carboxamide (BNAH); 1-(4-methoxybenzyl)-1,4-dihydropyridine-3-carboxamide (BNAH-OMe), 5-(1,2-dihydroxyethyl)-3,4-dihydroxyfuran-2(5H)-one (AA), and tetramethyl-para-analine.

The catalyst system can also contain polar aprotic solvents. Examples of suitable polar aprotic solvents include acetonitrile (MeCN), dimethylformamide (DMF), dimethylsulfoxide (DMSO), dimethylacetamide, methylene chloride (CH₂Cl₂), benzamide, acetone, methyl acetate, ethyl acetate, methyl ethyl ketone (MEK), tetrahydrofuran (THF), diethyl ether, propylene carbonate, and the like or mixtures thereof.

It is also contemplated that the catalytic systems can contain a protic solvent, e.g., water.

Methods of Making

The synthesis of the pincer CNC ligands (Scheme 1) begins with compound 5 (S. M. Winter, et al., Chem. Commun., 2010, 46, 4496), which undergoes nucleophilic aromatic substitution with two equivalents of deprotonated imidazole to yield compound 6 (86%). Compound 6 was treated with methyl triflate to form the dicationic imidazolium salt 7 in 79% yield. The NHC precursor 7 was then deprotonated with cesium carbonate to generate the bis-carbene in situ and coordinated to ruthenium by treatment with [(p-cymene)RuCl₂]₂ in acetonitrile (Scheme 1). The resulting yellow product was the ($^{OMe}$CNC)Ru complex 2 (83%), in which the coordination sphere of the ruthenium is completed by the presence of two acetonitrile ligands and one chloride. Complex 2 was treated with AgOTf in acetonitrile to remove the chloride ligand and form complex 3 in 94% yield. Complex 3 is air and light sensitive which is in dramatic contrast to stable complex 2. Complex 4 was synthesized in 92% yield in a similar manner to complex 2.

Scheme 1: Synthetic route to catalyst molecules

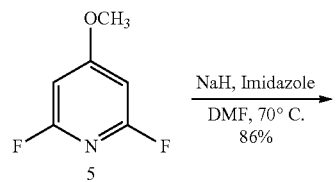

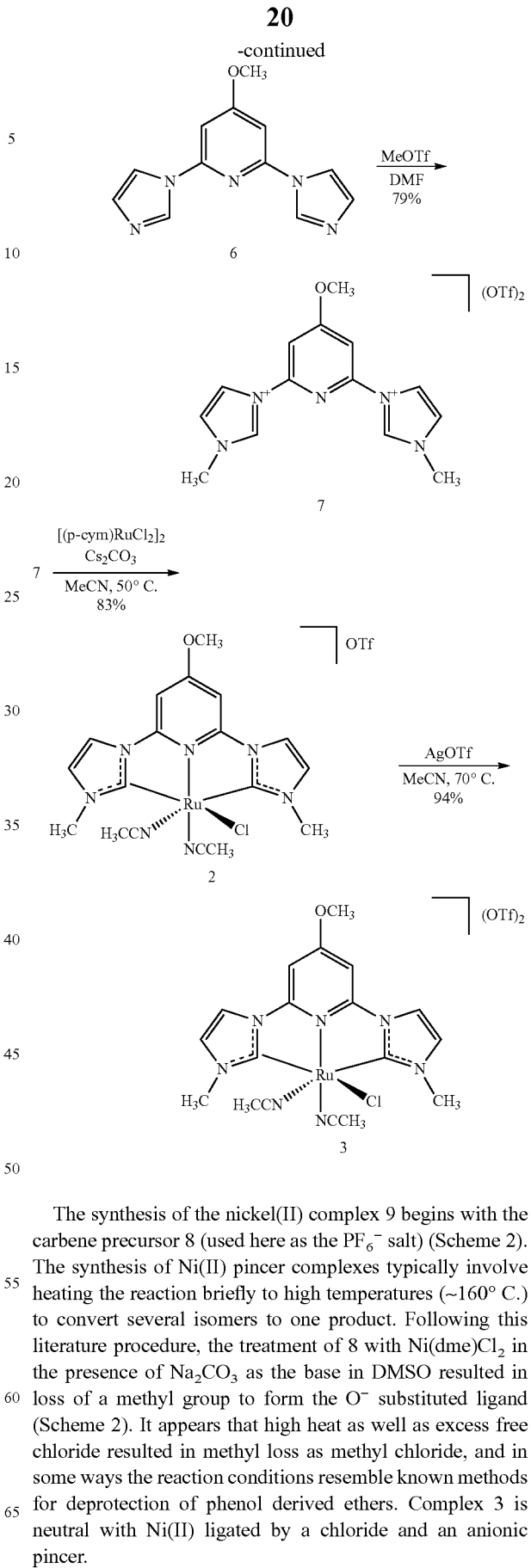

The synthesis of the nickel(II) complex 9 begins with the carbene precursor 8 (used here as the PF₆⁻ salt) (Scheme 2). The synthesis of Ni(II) pincer complexes typically involve heating the reaction briefly to high temperatures (~160° C.) to convert several isomers to one product. Following this literature procedure, the treatment of 8 with Ni(dme)Cl₂ in the presence of Na₂CO₃ as the base in DMSO resulted in loss of a methyl group to form the O⁻ substituted ligand (Scheme 2). It appears that high heat as well as excess free chloride resulted in methyl loss as methyl chloride, and in some ways the reaction conditions resemble known methods for deprotection of phenol derived ethers. Complex 3 is neutral with Ni(II) ligated by a chloride and an anionic pincer.

Scheme 2: Synthetic route to catalyst 9 and reversible protonation of 9 to give the acidic form, 9A.

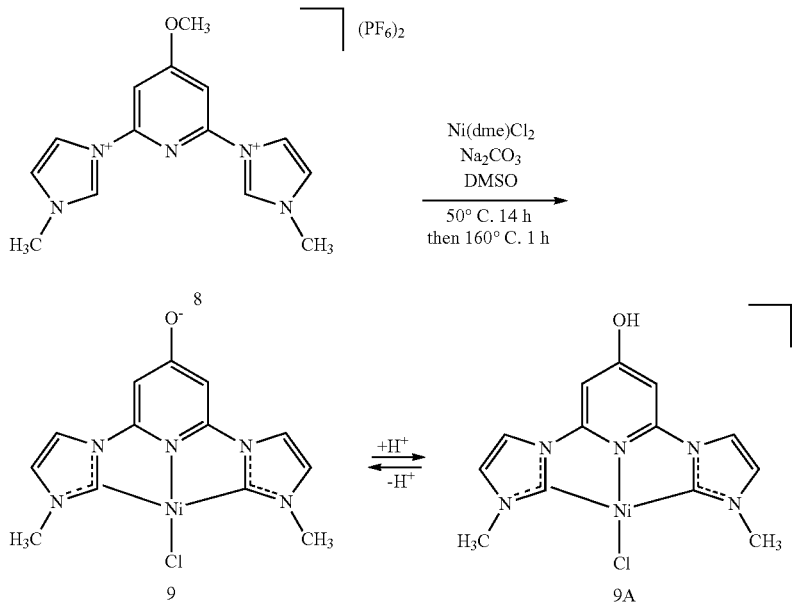

The synthesis of iron (12) and cobalt (13) catalyst is shown in Scheme 3. The synthesis begins with the iodine or triflate salt of the carbene precursor 8 (shown as 11 and 7, respectively. Complexation of the ligand with metal salt can be achieved by reacting with KOtBu and FeBr$_2$ or [Co(MeCN)$_6$](BF$_4$)$_3$ to obtain the final catalysts [Fe(CNC)$_2$]$^{+2}$ (12) and [Co(CNC)$_2$]$^{+3}$ (13) in good yields.

Scheme 3: Synthetic route to iron catalyst 12 and cobalt catalyst 13.

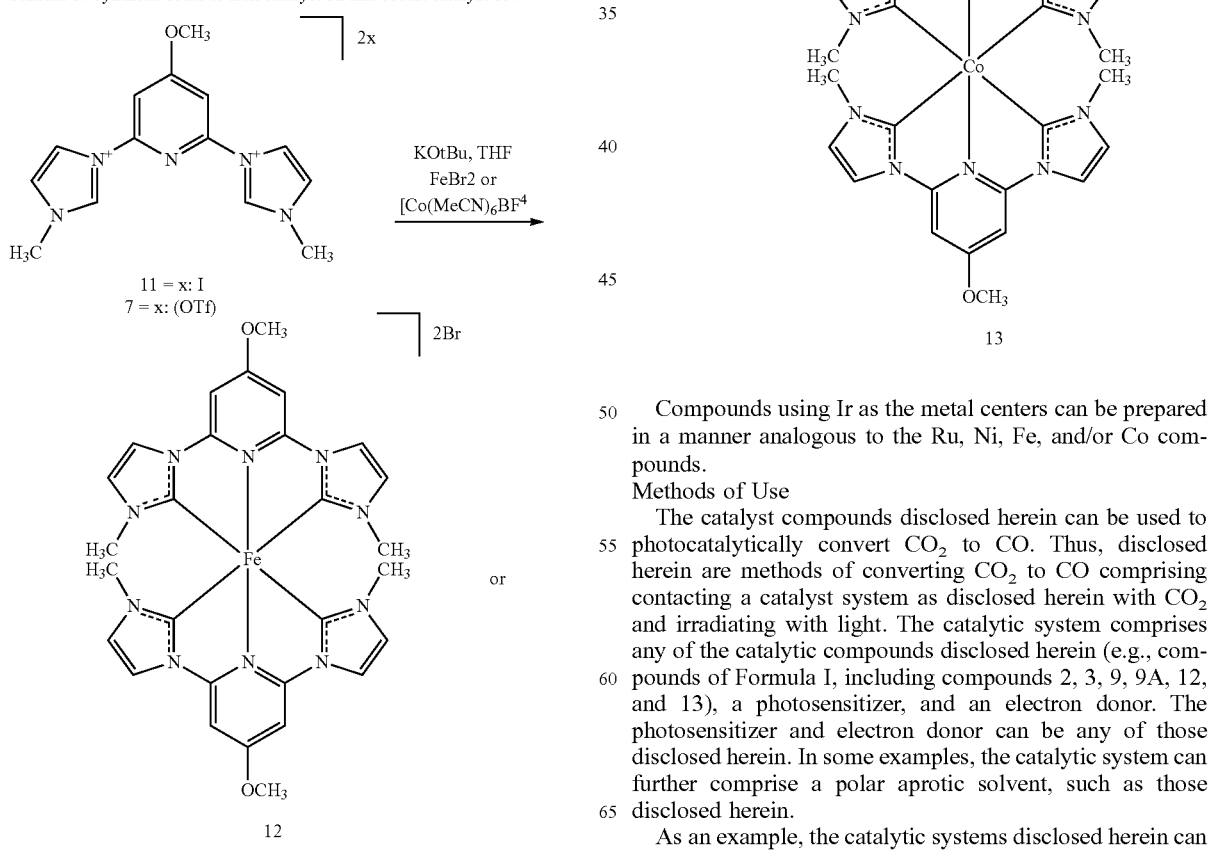

Compounds using Ir as the metal centers can be prepared in a manner analogous to the Ru, Ni, Fe, and/or Co compounds.

Methods of Use

The catalyst compounds disclosed herein can be used to photocatalytically convert $CO_2$ to CO. Thus, disclosed herein are methods of converting $CO_2$ to CO comprising contacting a catalyst system as disclosed herein with $CO_2$ and irradiating with light. The catalytic system comprises any of the catalytic compounds disclosed herein (e.g., compounds of Formula I, including compounds 2, 3, 9, 9A, 12, and 13), a photosensitizer, and an electron donor. The photosensitizer and electron donor can be any of those disclosed herein. In some examples, the catalytic system can further comprise a polar aprotic solvent, such as those disclosed herein.

As an example, the catalytic systems disclosed herein can be exposed/irradiated with a light source. An exemplary light souse is a 150 W Sciencetech SF-150C Small Collimated Beam Solar Simulator equipped with an AM 1.5 filter. The sun can also be the light source.

The methods of photocatalytically producing CO from $CO_2$ can proceed with a catalyst having a turnover frequency of less than 20 hr$^{-1}$, e.g., less than 15 hr$^{-1}$, less than 10 hr$^{-1}$, or less than 5 hr$^{-1}$. In further examples, the turnover frequency can be from 1 to 20 hr$^{-1}$, from 5 to 20 hr$^{-1}$, or from 10 to 20 hr$^{-1}$. The disclosed methods can also proceed with a catalyst having a turnover number of at least 100, e.g., at least 150, at least 200, at least 250. In further examples, the turnover number can be from 100 to 250, from 100 to 200, from 100 to 150, from 150 to 250, from 150 to 200, or from 200 to 250.

The disclosed methods can also selectively produce CO over other by products. That is, the disclosed methods can result in substantially no formate, formic acid, or methane. By substantially no is meant less than 5 wt. %, e.g., less than 2 wt. %, less than 1 wt. %, less than 0.5 wt. %, of the reaction mixture.

Examples

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

All solvents were dried on a glass contour solvent purification system built by Pure Process Technology, LLC or were used through commercially available dry solvents. Other commercially available reagents were used without further purification necessary. All reactions were prepared and executed under an inert $N_{2(g)}$ environment utilizing Schlenk line techniques or glovebox and oven or flame dried flask. Purifications were conducted open to air unless otherwise stated. Literature procedures were used for the preparation of 2,6-difluoro-4-methoxypyridine and 1,1'-(2,6-pyridinediyl)bis[3-methyl-1H-Imidazolium]ditriflate (S. M. Winter, et al., *Chem. Commun.* 2010, 46 (25), 4496-4498; M. Sheng, et al., *Dalton Trans.*, 2015, 44 (37), 16247-16250). NMR spectra were collected utilizing a Bruker AV360 360 MHz or AV500 500 MHz NMR spectrophotometer. Mid-IR spectra were obtained utilizing a Bruker Alpha ATR-IR spectrophotometer. MS Spectra were obtained utilizing a Waters AutoSpec-Ultima NT mass spectrometer or Waters Xero G2-XS Qtof Elemental analyses were performed by Atlantic Microlab, Inc. UV-Vis-NIR spectra were measured with a Cary 5000 instrument and a curvature with a 1 cm path length open to ambient atmosphere.

Synthesis of 2,6-di(1H-imidazol-1-yl)-4-methoxypyridine (6)

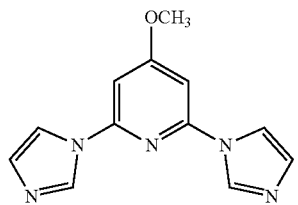

6

A Schlenk flask with stir bar was charged with sodium hydride (1.382 g, 57.58 mmol) and filled with 150 mL of DMF. With vigorous stirring and positive $N_{2(g)}$ flow, imidazole (3.9081 g, 57.405 mmol) was added portion wise to minimalize effervescence. A solution of 2,6-difluoro-4-methoxypyridine[1] (5) (4.141 g, 28.54 mmol) and 40 mL of DMF was then added to the reaction flask via cannula transfer. The reaction flask was then joined with an oven dried and $N_{2(g)}$ purged reflux condenser under positive pressure. The solution was then heated to 70° C. and stirred for 16 h. The crude reaction solution was filtered through a celite plug then the filtrate dried on a rotovap yielding the crude product as a yellow solid. The solid was purified through recrystallization in 40 mL of EtOH. The resulting solid was collected by filtration and wash with a minimal quantity of cold EtOH then cold ether. This resulted in pure product (6) as a white solid (5.9544 g, 86.48%). $^{1}$H NMR: (360 MHz, DMSO, RT, ppm) δ 8.76 (s, 2H, $H_{NCN}$), 8.15 (t, J=1.31 Hz, 2H $H_{im}$), 7.38 (s, 2H, $H_{py}$), 7.15 (t, J=1.02 Hz, 2H, $H_{im}$), 4.03 (s, 3H, $H_{OMe}$). $^{13}$C NMR: (126 MHz, CDCl3, RT, ppm) δ 170.16 (s, $C_{ortho}$), δ 149.78 (s, $C_{para}$), δ 135.13 (s, $C_{NCN}$), δ 131.05 (s, $C_{im}$), δ 116.23 (s, $C_{im}$), δ 96.16 (s, $C_{meta}$), δ 56.25 (s, $C_{OMe}$). $^{13}$C NMR: (126 MHz, DMSO, RT, ppm) δ 170.76 (s, $C_{ortho}$), δ 149.53 (s, $C_{para}$), δ 136.16 (s, $C_{NCN}$), δ 130.59 (s, $C_{im}$), δ 117.44 (s, $C_{im}$), δ 96.90 (s, $C_{meta}$), δ 57.30 (s, $C_{OMe}$). FT-IR (ATR, cm$^{-1}$): 3108 (m), 1613 (s), 1605 (s), 1503 (w), 1483 (s), 1442 (s), 1409 (w), 1307 (w), 1295 (s), 1291 (m), 1226 (s), 1219 (vs), 1205 (m), 1114 (w), 1069 (m), 1063 (s), 1014 (s), 991 (m), 977 (m), 906 (m), 863 (s), 830 (s), 755 (m), 744 (s), 657 (s), 626 (w), 600 (w), 543 (w), 471 (w). EI-HRMS (EI$^{+}$): m/z found (expected): 242.9859 ($C_{12}H_{13}N_5O^{+}$, 243.1112); 241.0955 ($C_{12}H_{11}N_5O^{+}$, 241.0964); 230.9856 ($C_{11}H_{13}N_5O^{+}$, 231.1120).

Synthesis of 1,1'-(2,6-p-methoxypyridinediyl)bis[3-methyl-1H-Imidazolium] ditriflate (7)

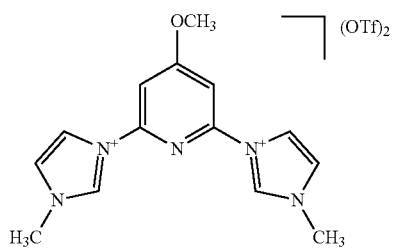

7

A Schlenk flask with stir bar was charged with 2,6-di(1H-imidazol-1-yl)-4-methoxypyridine (6) (1.5059 g, 6.2421 mmol) and filled with 35 mL of DMF. The flask was stoppered under $N_{2(g)}$ pressure and the mixture was then stirred till the solid dissolved. Methyl triflate (1.50 mL, 13.7 mmol) was added drop wise via a syringe to the reaction solution. The reaction solution was then left stirring for 16 h; a white solid precipitated out of solution. The reaction solution was then poured into a 250 mL RBF containing 125 mL of ether being stirred vigorously; after 1 h. of stirring more solid precipitate is observed. This solid was collected using a fritted filter and was rinsed with ether to yield the product (7) as a white solid (2.8065 g, 79.012%). $^1$H NMR: (500 MHz, DMSO, RT, ppm) δ 10.27 (s, 2H, $H_{NCN}$), 8.75 (s, 2H, $H_{im}$), 8.07 (d, 2H, $H_{im}$), 7.84 (s, 2H, $H_{py}$), 4.12 (s, 3H, $H_{OMe}$) 4.03 (s, 6H, $H_{NMe}$). $^{19}$F NMR: (339 MHz, DMSO, RT, ppm) δ −77.77 (s, $F_{OTf}$). $^{13}$C NMR: (126 MHz, DMSO, RT, ppm) δ 171.07 (s, $C_{para}$), δ 146.54 (s, $C_{ortho}$), δ 136.15 (s, $C_{NCN}$), δ 124.87 (s, $C_{im}$), δ 120.59 (q, J=323.10 Hz, $C_{OTf}$), δ 119.07 (s, $C_{im}$), δ 100.49 (s, $C_{meta}$), δ 57.69 (s, $C_{OMe}$), δ 36.52 (s, $C_{NMe}$). FT-IR (ATR, cm$^{-1}$): 3155 (w), 3098 (m), 3066 (w), 1623 (s), 1585 (m), 1544 (s), 1493 (m), 1460 (m), 1356 (w), 1246 (vs), 1228 (vs), 1224 (vs), 1156 (s), 1030 (vs), 1018 (s), 973 (m), 971 (m), 865 (m), 761 (m), 754 (m), 636 (vs), 620 (s), 575 (m), 518 (s), 509 (w), 414 (w). ESI-MS (ESI$^+$): m/z found (expected): 420.0950 [(CNC—OMe)OTf]$^+$=$C_{15}H_{17}F_3N_5O_4S^+$, 420.0953), 270.1359 [(CNC—OMe)-H]$^+$=$C_{14}H_{16}N_5O^+$, 270.1355).
Ruthenium Compounds.

Synthesis of [Ru(CNC—OMe)(ACN)$_2$Cl]OTf (2)

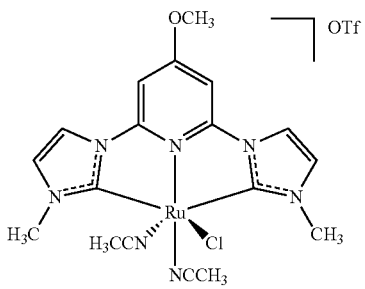

A Schlenk flask was charged with 1,1'-(2,6-p-methoxy-pyridinediyl)bis[3-methyl-1H-Imidazolium] ditriflate (7) (0.3293 g, 0.5787 mmol), cesium carbonate (0.4656 g, 1.429 mmol), and [RuCymCl$_2$]$_2$ (0.1540 g, 0.2515 mmol) and filled with acetonitrile (30 mL) resulting in a light orange mixture. The reaction solution was heated to 70° C. for 2 h; during which there was considerable quantity of precipitate that formed. The reaction was cooled and allowed to stir for 16 h. During which the precipitate dissolved and the reaction solution darken. The reaction solution was then poured through a silica plug and the filtrate was dried via a rotovap. The product (2) is obtain as a yellow solid residue (0.2651 g, 82.75%). $^1$H NMR: (360 MHz, CD3CN, RT, ppm) δ 7.91 (d, J=2.28 Hz, 2H, $H_{im}$), 7.29 (d, J=2.17 Hz, 2H, $H_{im}$), 7.11 (s, 2H, $H_{py}$), 4.11 (s, 6H, $H_{NMe}$), 4.01 (s, 3H, $H_{OMe}$), 2.53 (s, 3H, $H_{ACN}$), 1.86 (s, 3H, $H_{ACN}$). $^1$H NMR: (500 MHz, DMSO, RT, ppm) δ 8.43 (d, J=1.86 Hz, 2H, $H_{im}$), 7.63 (d, J=1.99 Hz, 2H, $H_{im}$), 7.59 (s, 2H, $H_{py}$), 4.10 (s, 6H, $H_{NMe}$), 4.05 (s, 3H, $H_{OMe}$), 2.71 (s, 3H, $H_{ACN}$), 2.10 (s, 3H, $H_{ACN}$). $^{19}$F NMR: (339 MHz, CD3CN, RT, ppm) δ −79.38 (s, $F_{OTf}$). $^{19}$F NMR: (360 MHz, DMSO, RT, ppm) δ −77.76 (s, $F_{OTf}$). $^{13}$C NMR: (126 MHz, DMSO, RT, ppm) δ 197.25 (s, $C_{NCN}$), δ 169.51 (s, $C_{para}$), δ 156.24 (s, $C_{ortho}$), δ 127.20 (s, $C_{ACN-CN}$), δ 124.64 (s, $C_{im}$), δ 123.84 (s, $C_{ACN-CN}$), δ 121.16 (q, J=323.10 Hz, $C_{OTf}$), δ 118.00 (s, $C_{im}$), δ 93.41 (s, $C_{meta}$), δ 57.78 (s, $C_{OMe}$), δ 37.37 (s, $C_{NMe}$), δ 4.03 (s, $C_{ACN-Me}$), δ 3.89 (s, $C_{ACN-Me}$). FT-IR (ATR, cm$^{-1}$): 3114 (w), 3083 (w), 2984 (vw), 2929 (vw), 2287 (vw), 2264 (w), 1630 (s), 1580 (m), 1555 (m), 1482 (s), 1454 (m), 1424 (w), 1404 (m), 1349 (m), 1263 (vs), 1238 (vs), 1222 (vs), 1137 (s), 1083 (vs), 970 (m), 943 (w), 874 (w), 841 (m), 790 (w), 746 (m), 699 (s), 636 (vs), 587 (m), 571 (m), 516 (s), 430 (w). ESI-HRMS (ESI$^+$): m/z found (expected): 488.0547 ([Ru(CNC—OMe)(ACN)$_2$Cl]$^+$=$C_{18}H_{21}ClN_7ORu^+$, 488.0572), 447.0276 ([Ru(CNC—OMe)(ACN)Cl]$^+$=$C_{16}H_{18}ClN_6ORu^+$, 447.0306), 406.0018 ([Ru(CNC—OMe)Cl]$^+$=$C_{14}H_{15}ClN_5ORu^+$, 406.0041), 226.5429 ([Ru(CNC—OMe)(ACN)$_2$]$^{2+}$=$C_{18}H_{21}N_7ORu^{2+}$, 226.5442), 206.0283 ([Ru(CNC—OMe)(ACN)]$^{2+}$=$C_{16}H_{18}N_6ORu^{2+}$, 206.0309). Anal. Calcd. for $C_{19}H_{21}O_4N_7SF_3ClRu$: C, 35.82; H, 3.32; N, 15.39. Found: C, 35.67; H, 3.23; N, 15.18.

Synthesis of [Ru(CNC—OMe)(ACN)$_3$](OTf)$_2$ (3)

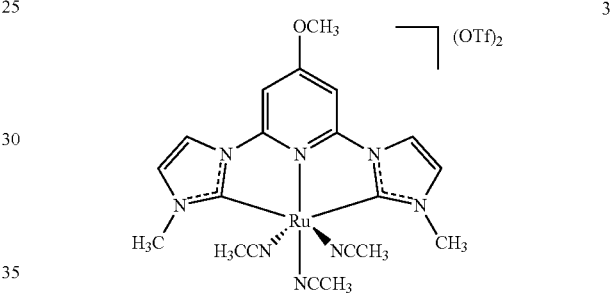

A Schlenk flask was loaded with [Ru(CNC—OMe)(ACN)$_2$Cl]OTf (2) (0.2270 g, 0.3564 mmol) and silver triflate (0.1177 g, 0.4581 mmol) and filled with acetonitrile (20 mL). The reaction solution was then heated to 70° C.; after which a white precipitate was noted. Heating for 2 h. led to a pale yellow reaction solution. The reaction was left heating overnight to obtain a pale yellow solution with a white solid. The reaction solution was filtered through a silica plug. The pale yellow filtrate was dried down yielding the product (3) as an off white solid (0.2821 g, 93.9%). $^1$H NMR: (360 MHz, DMSO, RT, ppm) δ 8.54 (d, J=2.13 Hz, 2H, $H_{im}$), 7.75 (d, J=2.13 Hz, 2H, $H_{im}$), 7.74 (s, 2H, $H_{py}$), 4.11 (s, 6H, $H_{NMe}$), 4.09 (s, 3H, $H_{OMe}$), 2.75 (s, 3H, $H_{ACN}$), 2.14 (s, 3H, $H_{ACN}$). $^{19}$F NMR: (339 MHz, DMSO, RT, ppm) δ −77.76 (s, $F_{OTf}$). $^{13}$C NMR: (126 MHz, DMSO, RT, ppm) δ 190.47 (s, $C_{NCN}$), δ 170.46 (s, $C_{para}$), δ 155.11 (s, $C_{ortho}$), δ 128.11 (s, $C_{ACN-CN}$), δ 125.06 (s, $C_{ACN-CN}$), δ 125.02 (s, $C_{im}$), δ 120.67 (q, J=321.41 Hz, $C_{OTf}$), δ 118.30 (s, $C_{im}$), δ 94.28 (s, $C_{meta}$), δ 57.67 (s, $C_{OMe}$), δ 37.18 (s, $C_{NMe}$), δ 3.61 (s, $C_{ACN-Me}$), δ 3.24 (s, $C_{ACN-Me}$). FT-IR (ATR, cm$^{-1}$): 3123 (w), 3096 (w), 2917 (w), 2266 (w), 1642 (m), 1581 (w), 1554 (w), 1491 (m), 1475 (m), 1413 (w), 1344 (w), 1244 (vs), 1242 (vs), 1222 (vs), 1193 (s), 1163 (s), 1161 (s), 1030 (vs), 1001 (w), 877 (w), 828 (w), 765 (w), 698 (m), 636 (vs), 571 (m), 516 (s), 436 (w). ESI-HRMS (ESI$^+$) m/z found (expected): 643.0637 ([Ru(CNC—OMe)(ACN)$_3$]OTf$^+$=$C_{21}H_{24}F_3N_8O_4RuS^+$, 643.0657), 602.0383 ([Ru(CNC—OMe)(ACN)$_2$]OTf$^+$=$C_{19}H_{21}F_3N_7O_4RuS^+$, 602.0371), 561.0102 ([Ru(CNC—OMe)(ACN)]OTf$^+$= $C_{17}H_{18}F_3N_6O_4RuS^+$, 561.0106), 247.0555 ([Ru(CNC—

OMe)(ACN)$_3$]$^{2+}$=C$_{20}$H$_{24}$N$_8$ORu$^{2+}$, 247.0575), 226.5429 ([Ru(CNC—OMe)(ACN)$_2$]$^{2+}$=C$_{18}$H$_{21}$N$_7$ORu$^{2+}$, 226.5442), 206.0312 ([Ru(CNC—OMe)(ACN)]$^{2+}$=C$_{16}$H$_{18}$N$_6$ORu$^{2+}$, 206.0309). Complex 3 is less stable than complex 2 and a suitable analysis (performed off site and shipped) could not be obtained.

Synthesis of [Ru(CNC—H)(ACN)$_2$Cl]OTf (4)

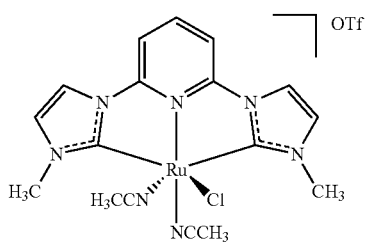

The synthesis of 4 followed procedure used to make 2, starting with 1,1'-(2,6-pyridinediyl)bis[3-methyl-1H-Imidazolium] ditriflate (0.3000 g, 0.5561 mmol), cesium carbonate (0.4680 g, 1.436 mmol), and [Ru(Cym)Cl$_2$]$_2$ (0.1534 g, 0.2505 mmol) to yield an orange solid (4) (0.2799 g, 0.4611 mmol, 92.04%). $^1$H NMR: (500 MHz, DMSO, RT, ppm) δ 8.44 (s, 2H, H$_{im}$), 8.03 (t, J=8.11 Hz, 1H, H$_{p-py}$), 7.84 (d, 8.11 Hz, 2H, H$_{o-py}$), 7.66 (s, 2H, H$_{im}$), 4.12 (s, 6H, H$_{NMe}$), 2.74 (s, 3H, H$_{ACN}$), 2.09 (s, 3H, H$_{ACN}$). $^{19}$F NMR: (339 MHz, CD3CN, RT, ppm) δ −77.75 (s, F$_{OTf}$). $^{13}$C NMR: (126 MHz, DMSO, RT, ppm) δ 195.75 (s, C$_{NCN}$), δ 155.60 (s, C$_{ortho}$), δ 138.96 (s, C$_{para}$), δ 127.49 (s, C$_{ACN-CN}$), δ 124.23 (s, C$_{im}$), δ 123.17 (s, C$_{ACN-CN}$), δ 120.60 (q, J=322.60 Hz, C$_{OTf}$), δ 117.51 (s, C$_{im}$), δ 105.09 (s, C$_{meta}$), δ 36.78 (s, C$_{NMe}$), δ 3.47 (s, C$_{ACN-Me}$), δ 3.30 (s, C$_{ACN-Me}$). FT-IR (ATR, cm$^{-1}$): 3098 (w), 2269 (w), 1613 (w), 1580 (w), 1556 (w), 1486 (m), 1398 (w), 1346 (w), 1256 (vs), 1228 (vs), 1149 (vs), 1029 (vs), 940 (m), 784 (m), 759 (m), 739 (m), 719 (m), 699 (w), 671 (m), 628 (vs), 573 (s), 513 (s), 426 (m). ESI-MS (ESI$^+$): m/z found (expected): 458.0446 ([Ru(CNC—H)(ACN)$_2$Cl]$^+$=C$_{17}$H$_{19}$ClN$_7$Ru, 458.0435).

Structure Comparisons.

Figure 2:
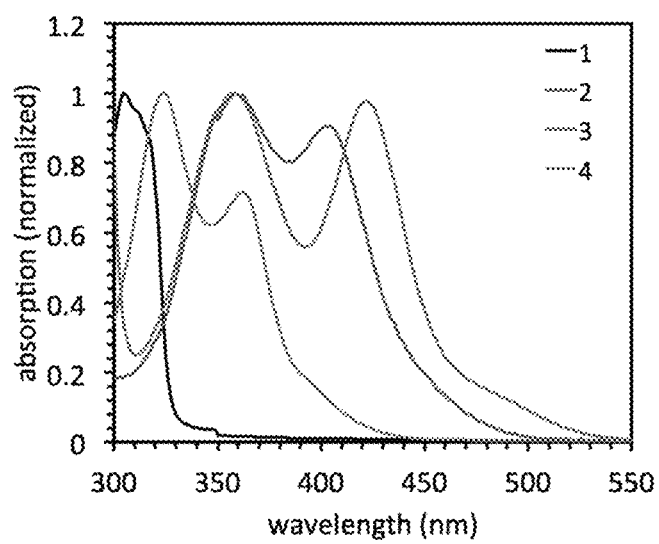
FIG. 2 is a UV-Vis spectra for the catalysts in acetonitrile.

The $^1$H NMR for complex 2 in CD$_3$CN shows that the acetonitrile ligand trans to the pyridine ring is labile, and exchanges readily with solvent (leading to less signal for this ligand). The expected integration values for CH$_3$CN ligands are seen by acquiring an $^1$H NMR in DMSO-d$_6$, presumably because ligand exchange does not occur in DMSO. This illustrates that free sites can readily be generated in acetonitrile for catalysis with this complex. The UV-Vis data shows the para electron donating substituent blue-shifts the metal-to-ligand charge transfer (MLCT) band from 422 nm to 404 nm (4 versus 2, FIG. 2). This is consistent with the prediction that the energy of the ligand based LUMO (π* character) should be increased by the electron donor group. Complex 3 exhibits a blue shift of both the π to π* band (at 324 nm) and the MLCT band (at 362 nm) due to the change in ligand field upon replacing chloride (an anionic π donor) in 2 with CH$_3$CN in 3.

XRD Structure Determination.

Figure 3:
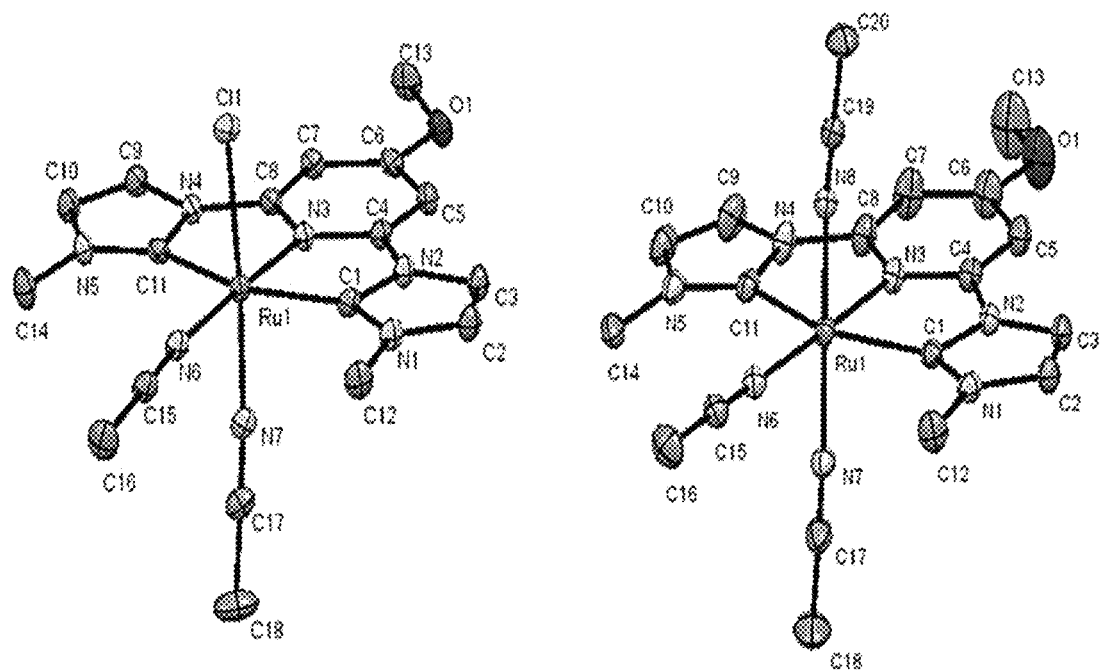
FIG. 3 contains ORTEP diagrams of the cations 2 (left) and 3 (right) with hydrogen atoms and counter anions omitted for clarity. Structures are shown with 30% probability ellipsoids.

Complexes 2 and 3 were recrystallized by slow evaporation of acetonitrile and were analyzed by single crystal X-ray diffraction (FIG. 3 and Table 1). Specifically, a crystal of appropriate dimension was mounted on Mitegen cryoloops in a random orientation. Preliminary examination and data collection were performed on a Bruker Apex2 CCD-based X-ray diffractometer equipped with an Oxford N-Helix Cryosystem low temperature and a fine focus Mo-target X-ray tube (λ=0.71073 Å) operated at 2000 W power (50 kV, 40 mA). The X-ray intensities were measured at 223 (2) K. The collected frames were integrated with the Saint software using a narrow-frame algorithm. Data were corrected for absorption effects using the multi-scan method in SADABS. The space groups were assigned using XPREP of the Bruker ShelXTL package, solved with ShelXT[5] and refined with ShelXL and the graphical interface ShelXle. All non-hydrogen atoms were refined anisotropically. H atoms attached to carbon were positioned geometrically and constrained to ride on their parent atoms.

TABLE 1

Selected bond lengths and angles for 2 and 3.

| Designation: | 2 | 3 |
|---|---|---|
| Bite Angle(°) | | |
| N3—Ru1—C$_{avg}$ | 77.72(8) | 77.6(1) |
| Ru-Pyridinol/NHC Bond Lengths (Å) | | |
| Ru1—Cl1 | 2.4300(6) | — |
| Ru1—N3 | 2.000(1) | 2.007(2) |
| Ru1—C$_{avg}$ | 2.062(3) | 2.067(4) |
| Acetonitrile Bond Lengths (Å) | | |
| Ru1—N6 | 2.045(1) | 2.046(2) |
| Ru1—N7 | 2.003(2) | 2.030(2) |
| Ru1—N8 | — | 2.030(2) |
| Ru1—N$_{avg}$ | 2.024(2) | 2.036(2) |
| C—N$_{avg}$ | 1.135(4) | 1.132(3) |

Both 2 and 3 exhibit octahedral geometries at the metal center and have similar geometries to reported (CNC)Ru complexes (M. Poyatos, et al., *Organometallics,* 2003, 22, 1110-1114). The Ru—N distances in 2 and 3 are slightly shorter (at ~2.00 Å) than in other similar (CNC)Ru complexes with either unsubstituted pyridine rings (e.g. 2.061(4) Å) or electron withdrawing substituents (e.g. Ru—N=2.031 (6) Å to 2.019(6)) (H.-J. Park et al., *Dalton Trans.,* 2012, 41, 5678-5686; H.-J. Park, et al., *Inorg. Chem.,* 2010, 49, 7340-7352). The Ru—C(NHC) distances are quite similar to those in analogous complexes.

The structure of 3 was found to have a triply occupationally disordered CF$_3$SO$_3^-$ ligand. The three components integrate to a ratio of 0.463:0.325:0.211, with the major component nearly perpendicular to the other two minor components. The overall occupancy of the three components was restrained to be unity by the Shelxl command SUMP. The three moieties were further restrained to have similar geometries (SAME command of Shelxl). These structures have been deposited in the Cambridge Structural Database with deposit numbers CCDC 1563864-1563865.

Photocatalysis Procedure.

The performance for each of the complexes 2-4 and the benchmark 1 were evaluated for photocatalytic CO$_2$ reduction using BIH (1,3-dimethyl-2-phenyl-2,3-dihydro-1H-benzo[d]imidazole) as a sacrificial electron source, triethylamine (TEA), acetonitrile, and Ir(ppy)$_3$ as a photosensitizer (PS) irradiated with a solar simulator set to 1 sun intensity. Specifically, a 150 W Sciencetech SF-150C Small Collimated Beam Solar Simulator equipped with an AM 1.5 filter was used as the light source for the photocatalytic experiments. Head space analysis was performed using a VICI gas tight syringe with stopcock and a custom Agilent 7890B Gas Chromatography instrument equipped with Agilent PorapakQ 6 ft, ⅛ O.D. column. Quantitation of CO and $CH_4$ were made using an FID detector, while $H_2$ was quantified using a TCD detector. All calibrations were done using standards purchased from BuyCalGas.com.

To a 17 ml vial was added BIH (0.005 g, 0.02 mmol), MeCN (6 ml, bulk or anhydrous), and catalyst (0.2 ml from $1\times10^{-3}$ M in MeCN solution). The solution was bubbled vigorously with $CO_2$ for at least 15 minutes until the solution volume reached 1.9 ml and then 0.1 ml of degassed triethylamine was added to the mixture. The tube was sealed with a rubber septum and irradiated with a solar simulator. Head space samples were taken and the pressure was adjusted to atmospheric pressure by pressurizing the sample (300 μL taken from the headspace then compressed to 250 μL) then submerging the sealed gas tight syringe into diethyl ether. The syringe was open and gas was observed exiting the needle tip. The syringe was then sealed, removed from the diethyl ether solution and injected into the GC mentioned above.

Figure 4:
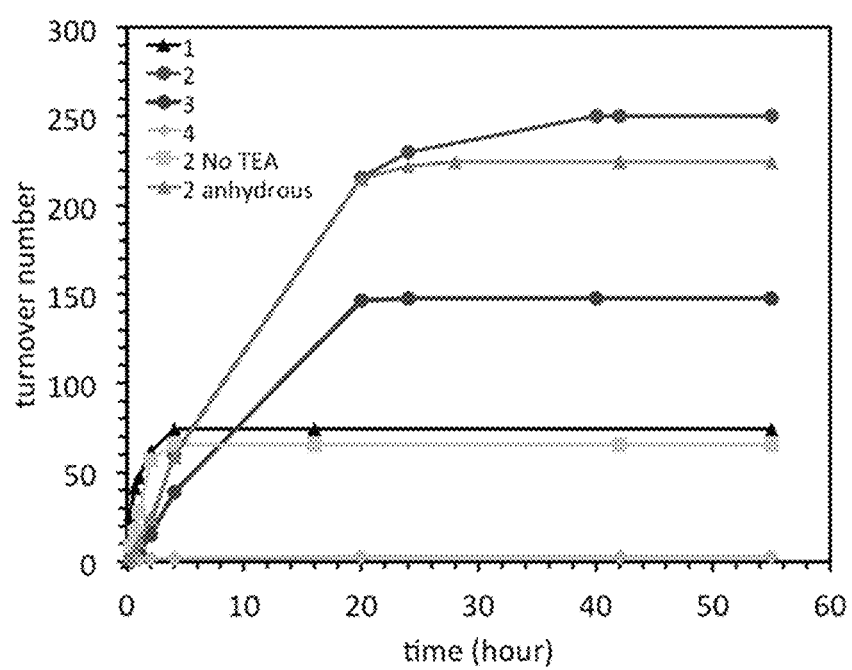
FIG. 4 is a graph of turnover numbers for CO production for complexes 1-4 upon irradiating with a solar simulator. Each data point is the average of 2 experiments.

Under these conditions, the benchmark bpy catalyst 1 produced CO for 4 hours before ceasing production at 74 turnovers with an initial turnover frequency (TOF) of 78 $h^{-1}$ (FIG. 4, Table 2). The NHC and 4-methoxy-pyridine derived pincer catalyst 2 is substantially more durable reaching a TON value of 250 over 40 hours with an initial TOF of 15 $h^{-1}$. Interesting, catalyst 3, which is light sensitive in solution under inert atmosphere, was found to give CO at 147 TON over a 20 h time period with an initial TOF of 10 $h^{-1}$ under photocatalytic conditions. Initially, catalyst 1 is the most active and initial rates for catalysts 2 and 3 are slower and similar to each other. However, due to the robust nature of 2 and 3 their final TON values far exceed that of the benchmark 1. This dramatic increase in durability was attributed in part to the strongly chelating NHC and 4-methoxy-pyridine pincer ligand prohibiting dissociation of the metal center. Surprisingly, complex 4 with a pyridine in place of the 4-methoxy-pyridine ring of 2 gave only 3 TON in 20 hours of irradiation with an initial TOF of 1 $h^{-1}$. This result clearly sets forward the importance of the para donor substituent for efficient catalysis. Similar examples of dramatic substituent effects are rare, but not unheard of, in catalysis and include example in nitrogen reduction, water oxidation and $CO_2$ reduction.

To demonstrate the effect of each component of the catalytic system, components of the photochemical reaction with complex 2 were systematically removed and the effect on catalysis observed. Removal of the PS from the system gave no detectable CO production, which indicates that despite the absorption of the Ru complexes being shifted to the visible range relative to benchmark 1, no direct photocatalysis occurs. Water is frequently implemented as both advantageous and detrimental in $CO_2$ reduction catalysis. To probe the effects on the catalytic system, rigorously anhydrous conditions were imposed with multiply distilled, dried reagents. However, no substantial effect is observed when compare to the use of open to ambient atmosphere benchtop reagents (222 vs 250 TONs). TEA is can serve several roles in the photochemical reaction including as a SD, a proton donor after electron transfer, and as a base in the reaction. Removal of this component led to a lower TON of 65 and a dramatically reduced durability of catalyst 2 with CO production ceasing after 4 hours. However, the initial rate of reactivity is significantly higher in the absence of TEA. Removal of BIH led to no observed CO suggesting TEA does not function simply as a SD in this system. Finally, removal of $CO_2$ from the system shows no CO production from any of the reaction components under inert atmosphere.

Interestingly, under these conditions CO is observed as the sole product with no detection of formate for any of the catalysts. Benchmark 1 has been reported to give a mixture of formate and CO under alternate reaction conditions. The change of selectivity for benchmark 1 suggests the conditions disclosed herein are uniquely effective at increasing reaction selectivity when compared with prior reports utilizing triethanolamine (TEOA), 1-benzyl-1,4-dihydronicotinamide (BNAH) as a SD, DMF (N,N-dimethylformamide) as solvent, and $Ru(bpy)_3$ or $Ru(dmbpy)_3$ as the photosensitizer (where dmbpy is 4,4'-dimethylbipyridine).

TABLE 2

Photocatalytic reaction comparison.

| complex | change | time (hours) | TON (CO) |
|---|---|---|---|
| 1 | none | 4 | 74 |
| 2 | none | 40 | 250 |
| 3 | none | 20 | 147 |
| 4 | none | 20 | 3 |
| 2 | no $Ir(ppy)_3$ | 20 | 0 |
| 2 | anhydrous | 24 | 222 |
| 2 | no TEA | 4 | 65 |
| 2 | no BIH | 20 | 0 |
| 2 | no $CO_2$ | 20 | 0 |

*Each entry is the average of two experiments.

$^1$H NMR Formate Detection (Fei, H.; et al., Inorg. Chem. 2015, 54, 6821). Upon reaction completion, 0.8 mL of the reaction solution was taken into a syringe and added to a 4 mL vial. To this 36 μL of Verkade's Triisobutyl Superbase (CAS#331465-71-5; 2,8,9-Triisobutyl-2,5,8,9-tetraaza-1-phosphabicyclo[3.3.3]undecane) or 36 μL of DBU (1,8-Diazabicyclo[5.4.0]undec-7-ene) was added to the solution. If DBU is used, the sample solution is degassed with $N_2$ for 10 minutes and then refilled with MeCN to replace the original volume before adding DBU. This is necessary as DBU reacts with $CO_2$ and form a precipitate. This precaution is not necessary if using Verkade's Base. The mixture was sonicated for 10 minutes at room temperature. 1.16 mL of a $d_3$-MeCN ferrocene solution (1.19 mM concentration) was added to the mixture. The vial was thoroughly mixed, then an NMR spectrum was taken on a 500 MHz NMR or 300 MHz NMR with an extended D1-delay of 10 seconds and a minimum of 200 scans. The ratio of the formate peak (~8.7 ppm) and the ferrocene peak (~4.2 ppm, see below) were then compared to a calibration curve generated through the analysis of known concentrations of formate (0.0 mM, 0.1 mM, 1.0 mM, and 10.0 mM solutions). Through this method the concentration of formate could be evaluated accurately through a trendline having an $R^2$ value of 0.997 and 0.999. All NMR spectra were evaluated with MestReNova software to ensure level baselines in the analyte region prior to integrating peaks.

Nickel Compounds.

Synthesis of [Ni(CNC—O⁻)Cl] (9)

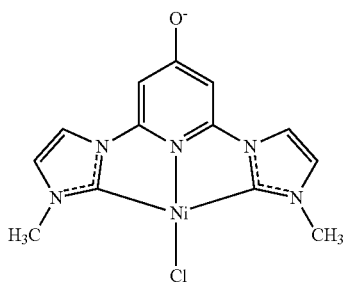

This complex is sensitive to protic solvents, but it can be studied in aprotic organic solvents like DMSO and $CH_3CN$. Complex 9 can be reversibly protonated to form 9A, which is a cation. For example, in DMSO, triflic acid can protonate 9 and then proton sponge can be used to deprotonate 9A as followed by UV-Vis spectroscopy. Acetic acid ($pK_a=12.3$ in DMSO) appears to be too weak an acid to protonate 9. These results show that the $pK_a$ of 9A is between zero and ~10 in DMSO.

Figure 5:
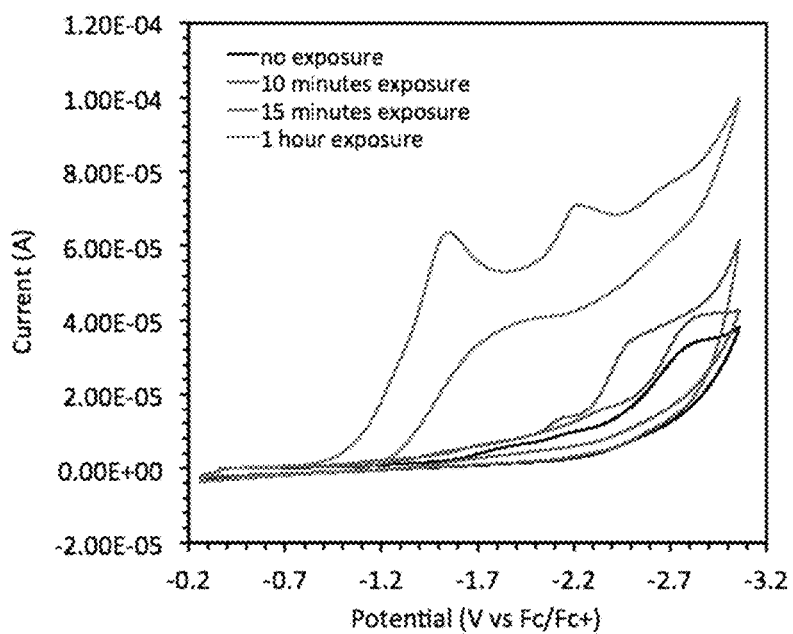
FIG. 5 shows cyclic voltammograms of complex 9 with variable ambient fluorescent light exposure. The electrolyte is 1.0 M $Bu_4NPF_6$ in acetonitrile with a glassy carbon working Ag/AgCl reference, and Pt counter electrodes. Each CV is a freshly prepared solution of 1.0 mM complex 9 after light exposure.

Complex 9 was evaluated for the electrocatalytic reduction of $CO_2$ via cyclic voltammetry (CV) experiments to compare with known electrocatalyst 10 (M. Sheng, et al., Dalton. Trans., 2015, 44, 16247-16250). Similar to catalyst 10, a catalytic current increase was apparent for complex 9 at the third reduction wave when CV scans under argon and $CO_2$ atmospheres were compared (FIG. 5). Interestingly, upon exposure of the solution to 10 minutes of ambient fluorescent light, the CV curve shape began to noticeably change and an additional increase in current beginning at −2.35 V versus $Fc^+/Fc$ was observed (FIG. 5). This current increase grew significantly upon additional ambient light exposure for a total of 15 minutes. After 1 hour of light exposure, the CV curve shape was completely changed and give new features including a substantially lower reduction wave onset at −1.0 V versus −2.5 V. These results clearly indicate complex 9 is readily photoreacted to give a new complex over time even under weak fluorescent lighting. Presumably, under photocatalytic conditions, this new species is the primary complex in solution.

Photocatalysis Procedure.

The photocatalytic performance of complex 9 was tested as described above for complexes 2-4. In an acetonitrile solution with $Ir(ppy)_3$, BIH, and triethylamine (TEA) saturated with $CO_2$, complex 9 gives 10.6 turnovers (TON; moles CO/moles complex) when irradiated with a solar simulator to approximate natural sunlight over a six hour period (Table 3, FIG. 6). Under identical conditions complex 10 gives only 0.1 TON. This highlights the critical need of the remote $O^-$ group for higher catalyst activity. Changing the solvent to DMF lead to a similar TON value of 9.5 (Table 3, entry 3) for complex 9 and no appreciable change for complex 10. When TEA was removed from the reaction mixture, the TON values for complex 3 dropped dramatically (Table 3, entry 5). Since TEA can have multiple roles (electron source, proton source after electron transfer, base) in the reaction mixture, a surrogate base (proton sponge) was used to give 5.6 TON with complex 9, which suggests one of the primary roles of TEA is to serve as a base (Table 3, entry 6). BIH is known to have an acidic proton once post electron transfer, and TEA may be necessary to keep the reaction pH high. To test the effect of acid on the photocatalysis with 9, triflic acid (TfOH) was added as strong acid to give low reactivity (1.3 TON, Table 3, entry 7) This result highlights the importance of keeping the strongest acid $pK_a$ low in the mixture as the protonated complex 9A is likely a poor catalyst potentially due to a diminished electron donation strength from the OH group versus an $O^-$ group. Negative controls removing $Ir(ppy)_3$, BIH, $CO_2$ or complex 9 all gave <1 TON which confirms all reaction components are necessary and the observed CO is coming from $CO_2$ reduction.

TABLE 3

Photocatalytic reduction of $CO_2$ under various conditions.

| entry | complex | change | $TON_{max}$ |
| --- | --- | --- | --- |
| 1 | 9 | none | 10.6 |
| 2 | 10 | none | 0.1 |
| 3 | 9 | no MeCN, with DMF | 9.0 |
| 4 | 10 | no MeCN, with DMF | 0.5 |
| 5 | 9 | no TEA | 1.8 |
| 6 | 9 | no TEA, with proton-sponge | 5.6 |
| 7 | 9 | add TfOH, no TEA | 0.9 |
| 8 | 9 | no Ir | 0.6 |
| 9 | 9 | no BIH | 0.3 |
| 10 | 9 | no $CO_2$, with $N_2$ | 0.2 |

[a]Standard conditions: 0.1 mM Ni-complex, 0.1 mM $Ir(ppy)_3$, 11 mM BIH, 0.1 mL TEA, 1.9 mL MeCN, room temperature, 150 W Xenon Lamp with an AM 1.5G filter for solar simulation.

Figure 6:
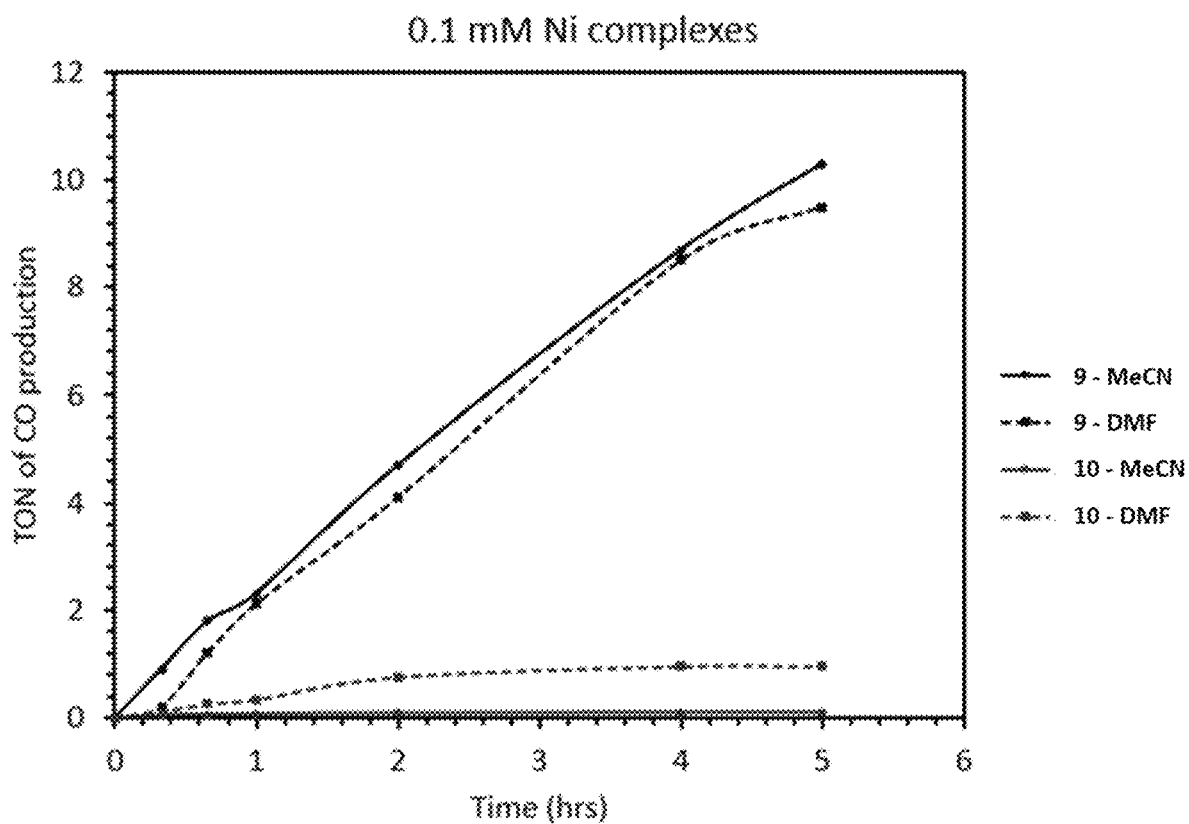
FIG. 6 is a graph showing turnover number versus time for photocatalytic reactions with complexes 9 and 10.

The rate of reactivity of complex 9 was found to consistently give a turnover frequency (TOF; TON/time) of ~2.2 $h^{-1}$ for the first 4 hours before CO production ceased slowed at 5 hours and ceased by 6 hours (FIG. 6). The difference in CO produced with MeCN versus DMF is largely due to an additional ~30 minutes of sustained catalysis with MeCN as the initial rates over the first 4 hours are near identical. Providing the active catalyst results from photo-dissociation of the $Cl^-$ ligand on complex 9, the similar rates in DMF and MeCN suggests this coordination site is not strongly associated with either solvent.

Iron and Cobalt Compounds

Synthesis of $[Fe(CNC)_2]Br_2$ (12)

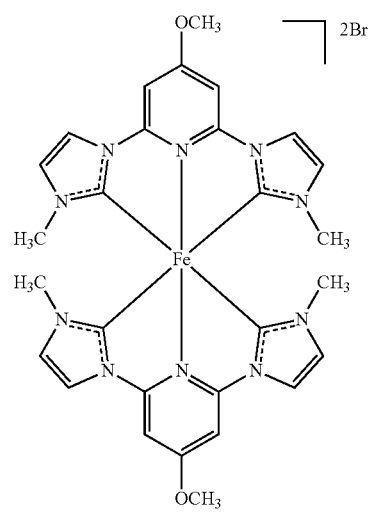

An oven dried round bottom flask was loaded with the iodide salt of the pincer pre-ligand $(Im^{Me}\text{-py}^{OMe}\text{-}Im^{Me})I_2$ (0.2994 g, 0.570 mmol, 1.9 equiv.) and taken into the glovebox. KOtBu (0.129 g, 1.150 mmol, 3.8 equiv.) was massed and loaded into the RB flask with about 15 mL dry, FPT THF (THF subjected to 3 freeze pump thaw cycles or air-free, dry THF). This suspension was stirred about 2 hours. The suspension color should change from yellow to brown/orange. An oven dried Schlenk flask was taken into the glovebox and loaded with FeBr$_2$ (0.066 g, 0.306 mmol, 1 equiv.) and 10 mL dry, FPT THF and stirred to dissolve. The pincer solution was filtered over Celite with suction into the iron solution with stirring. A pale solid (KI) was collected on the Celite and was washed with THF until the filtrate runs colorless. The resulting reaction mixture was stirred overnight. By morning an orange/red solid suspension had formed which was collected by suction filtration with a fine frit. This solid was washed with Et$_2$O and dried on the frit with vacuum. The orange/red solid product was collected (0.180 g, 0.239 mmol, 83.7% yield, C$_{28}$H$_{30}$N$_{10}$O$_2$FeBr$_2$, mw: 754.27 g/mol). Some finer solid passed through the frit to the filtrate which was layered with Et$_2$O to achieve more precipitation. This solid can also be collected by suction filtration with a fine frit to yield product. $^1$H-NMR (360 MHz, CD$_3$CN, RT, ppm) δ 8.05 (s, 2H), 7.43 (s, 2H), 6.98 (s, 2H), 4.11 (s, 3H), 2.57 (s, 6H). EI-MS (where [M] is [C$_{28}$H$_{30}$N$_{10}$O$_2$Fe]): m/z=297.1 [M]$^{2+}$.

Synthesis of [Co(CNC)$_2$]3BF$_4$ (13)

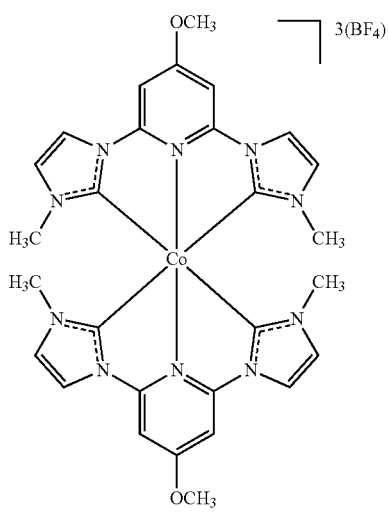

Synthesis of this complex is analogous to the Fe(II) complex except for the use of [Co(MeCN)$_6$](BF$_4$)$_2$ (0.139 g, 0.290 mmol, 1 equiv) as the metal source. The pink Co$^{(II)}$ solution immediately turns to a mossy green suspension with the filtration of the ligand solution to the metal solution. After stirring overnight, the mossy green solid was collected on a fine frit by suction filtration leaving a golden yellow filtrate. The solid was dried under vacuum and collected (0.146 g, 58.7% yield, C$_{28}$H$_{30}$N$_{10}$O$_2$CoB$_3$F$_{12}$, mw: 857.98 g/mol for Co$^{(III)}$). The filtrate was taken to dryness to give an insignificant amount of yellow residue. CV data suggests the oxidation state of Co is actually Co$^{(III)}$. The $^1$HNMR spectrum, although the signals are broadened, agrees that the complex is likely diamagnetic, and MS confirms that the cation complex is 1 Co: 2 pincers. The counter ion is assumed to be BF$_4^-$. Subsequent to isolation of the crude product, the product was treated with excess (10x) NaBF$_4$ to ensure that all of the anions are BF$_4$. A purification procedure was then done to remove the excess NaBF$_4$ and other salts. $^1$H-NMR (360 MHz, CD$_3$CN, RT, ppm) δ 8.10 (s, 2H), 7.58 (s, 2H), 7.21 (s, 2H), 4.22 (s, 3H), 2.81 (s, 6H). $^{19}$F-NMR (360 MHz, CD$_3$CN, RT, ppm) δ −150.04. EI-MS (where [M]=[C$_{28}$H$_{30}$N$_{10}$O$_2$Co]) m/z=199.0 [M]$^{3+}$, 342.1 ([M]+BF$_4$)$^{2+}$, 596.0 [M-H]$^+$, 771.1 ([M]+(BF$_4$)$_2$)$^+$.

Photocatalysis Procedure.

Figures 8A, 8B, 8C:
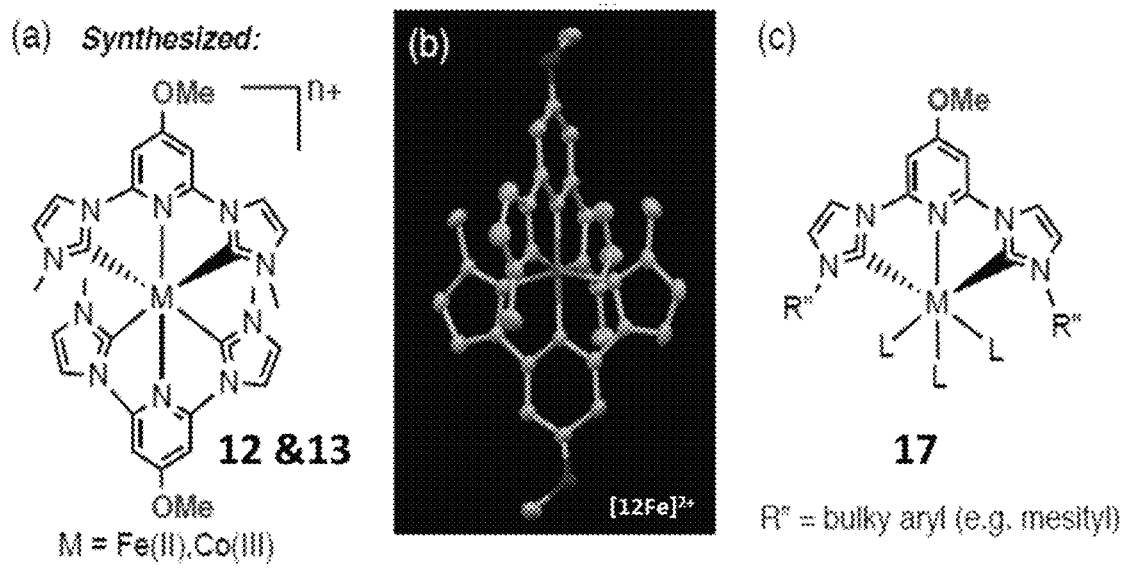
FIGS. 8A-8C show structures of metal complexes disclosed herein.

Photocatalysis were performed with ligands 7, 11, and FeBr$_2$ to understand the mechanistic pathway for the photocatalysis. The studies show that the rate and number of TONs of CO is comparatively low for ligand and FeBr$_2$. That explains that the photocatalysis is occurring in a different mechanistic pathway. But as shown in the catalyst structures both catalysts are coordinatively saturated and not baring any labile ligands so at least one binding site of one ligand comes off from the metal center to create an open coordination site (FIG. 8A-8C). Since the catalyst is not active as pure electrocatalyst, indirect photocatalysis happened via totally different intermediate.

Cyclic Voltammetry

Non-aqueous CV was performed in the glovebox (under N$_2$ atmosphere) in MeCN, with 0.1 M Bu$_4$NPF$_6$ electrolyte, glassy carbon working electrode, Pt counter electrode, and Ag wire calibrated with Fc$^{0/+}$ reference electrode. 1.0 mM solution of 12 was found to not be concentrated enough, so solid was added to the stirring solution in the cell to make an unknown higher concentrated solution. 3.6 mM (31 mg in 10 mL) of 13 was adequate concentration for study. The open circuit resting potential was found to be −5 mV, which is on the oxidized side of the quasi-reversible Co$^{2+/3+}$ redox event seen at ∼−664 mV, further lending to the evidence that the complex is Co$^{3+}$. UV/vis of this CV sample solution was taken open to the air, with Bu$_4$NPF$_6$ solution as background. No apparent color change occurs with exposure to air. The spectrum contains no striking features in the visible, with only shoulders seen in the UV region.

Ruthenium Catalysts for Light Driven CO$_2$ Reduction:

The examples above involved the use of 6,6'-dihydroxybipyridine (dhbp) metal complexes for catalysis. However, the 6,6'-dhbp ligand can, under some conditions, be labile and coordinatively flexible when bound to first row metals. Furthermore, significant steric bulk near the metal center (as is often needed for first row metals) is not possible with 6,6'-dhbp. Bidentate ligands that combine NHC and pyridinol moieties, these ligands supported Ir(III) and Ru(II) complexes for catalytic CO$_2$ hydrogenation is described herein. This ligand scaffold undergoes a facile cyclometallation reaction with base to generate side products. An alternative to this method includes incorporating the pyridinol ring into a rigid pincer scaffold as shown below.

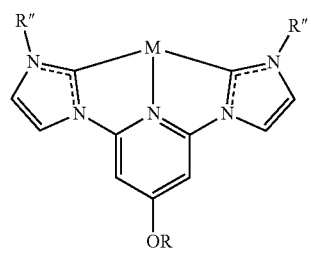

OR = OH, OMe, O$^-$
R'' = alkyl, aryl

The OH group (O— once deprotonated) para to the pyridine N can still influence electronic properties and reactivity but cannot bind to the metal. Steric bulk is readily incorporated (R'') and the NHC rings on a pincer framework prevent lability. Furthermore, the scaffold above is a strong field ligand that leads to a low spin configuration, as verified both experimentally (described herein) and computationally (for Fe(II)). In some instances, for the pyridine analog of the scaffold (replace OR with H), the CNC transition metal complexes thereof may not catalyze light driven $CO_2$ reduction. The introduction of para substituents that are electron donors (OMe or O—) appears to be transformative.

Figure 7A:
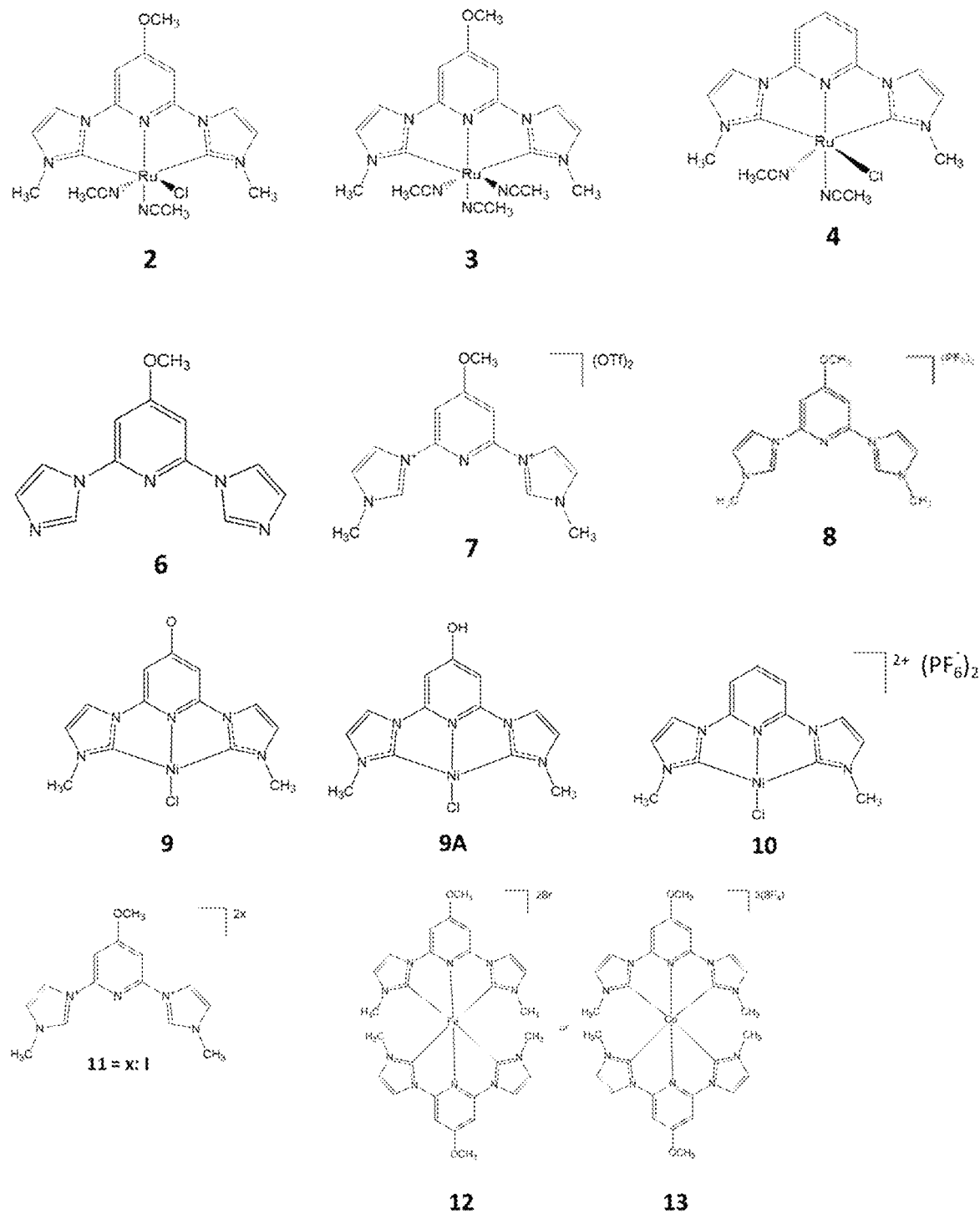
FIGS. 7A-7B show structures of metal complexes disclosed herein.
Figure 7B:
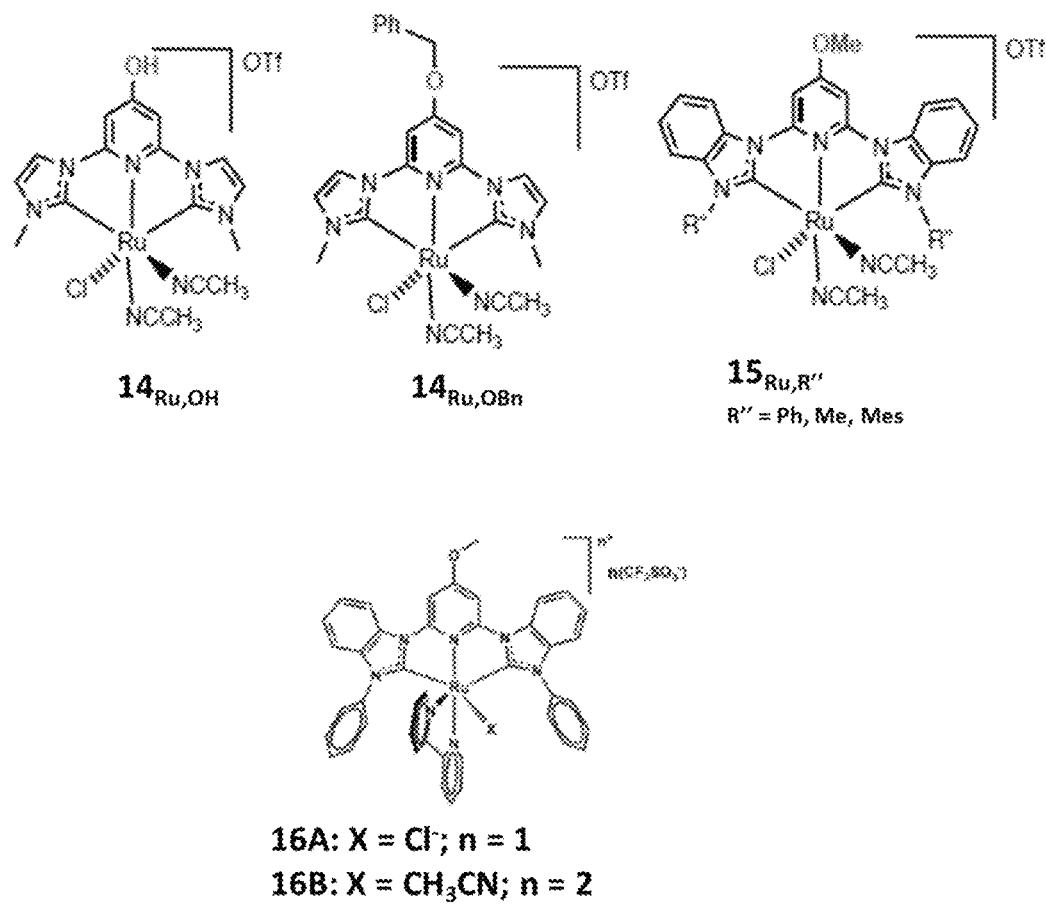
Figure 9:
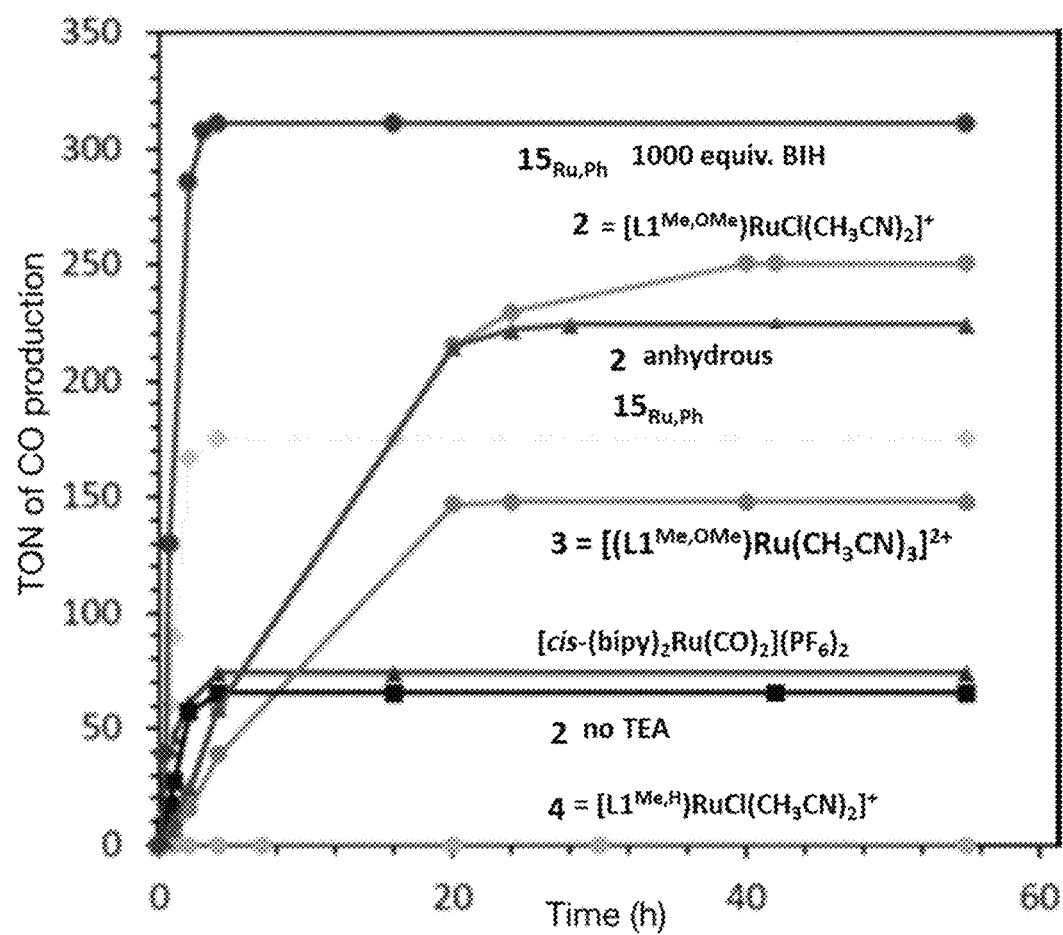
FIG. 9 shows non-sensitized $CO_2$ reduction to CO with compounds in FIG. 7.
Figure 10A:
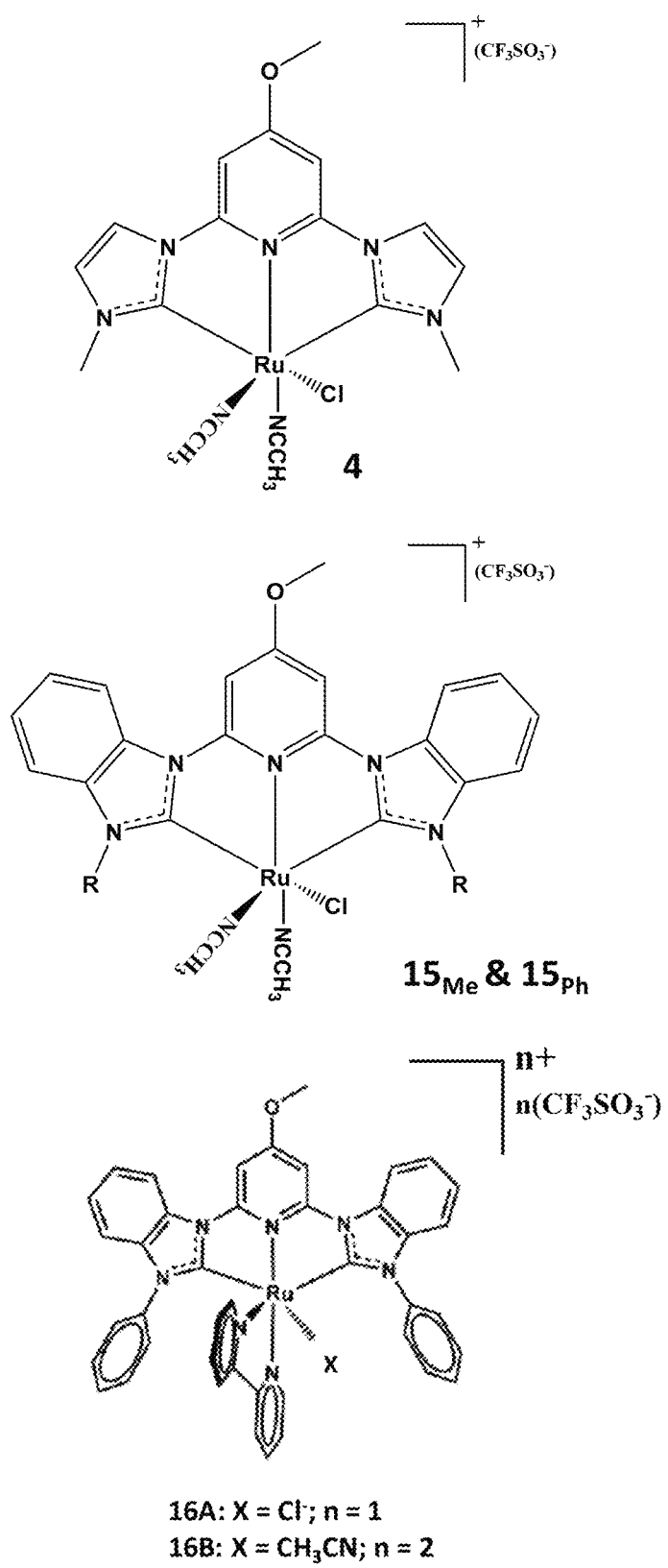
FIGS. 10A and 10B show synthesized metal complexes (FIG. 10A) and non-sensitized $CO_2$ reduction to CO with compounds in FIG. 10A.
Figure 10B:
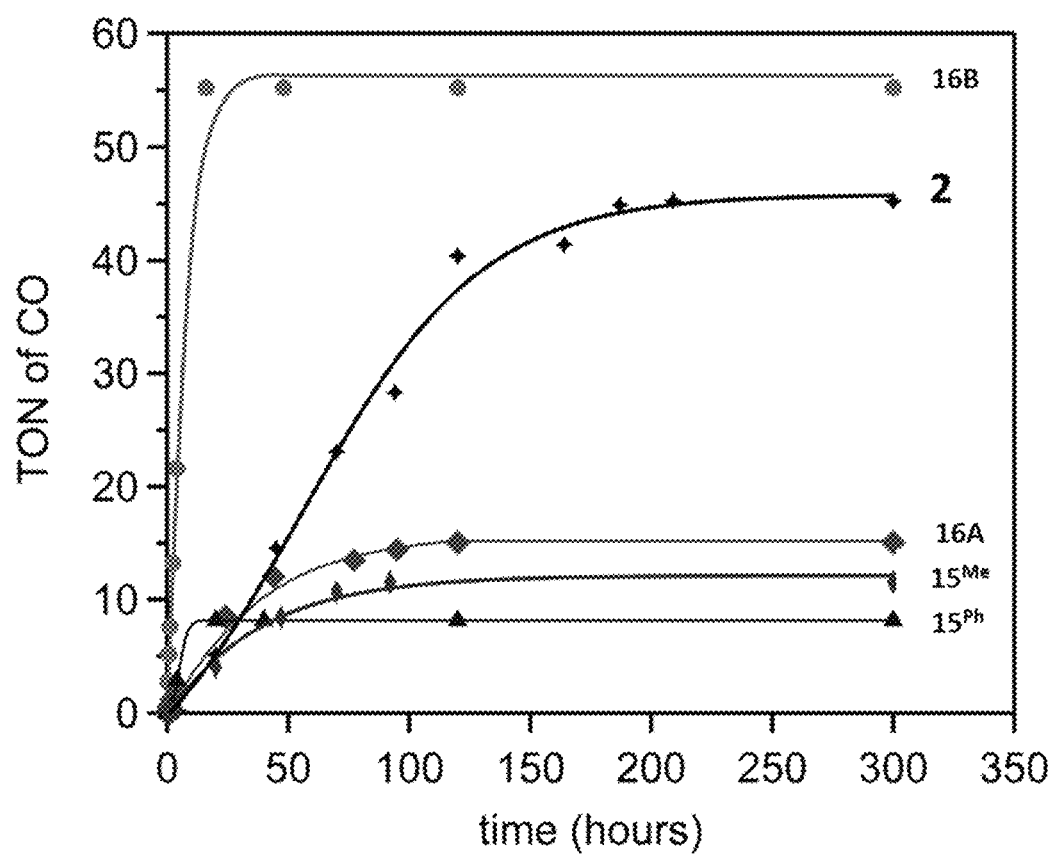

New pincer ligand with a methoxy group on the central pyridine ring has been described herein. The methoxy group alters the electronic features of the catalyst ($LRuCl(CH_3CN)_2]^+$) where L=a CNC pincer ligand (FIGS. 7A-7B). Through the use of a PS, metal complexes are known to photocatalytically reduce $CO_2$. First, the PS (typically $Ir(ppy)_3$) is photoexcited to generate a reducing species, which accepts an electron from a sacrificial donor (SD, such as TEA (triethylamine) and/or BIH (1,3-dimethyl-2-phenyl-2,3-dihydro-1H-benzo[d]imidazole)). The reduced PS then can transfer an electron to the metal catalyst, which may interact with $CO_2$ before accepting a second electron to reduce $CO_2$ to CO along with formation of $H_2O$ or $CO_3^{2-}$ (in the presence or absence of H+, respectively). Our photocatalytic conditions lead to selective $CO_2$ reduction to form exclusively CO, which has not been achieved previously with ruthenium catalysts. The CNC catalysts described in this example are robust and this appears to be due to the methoxy group (using 2 with $L=L1^{Me,OMe}$, $TON_{max}=250$ and a lifetime of 40 h was observed, see FIG. 9). The unsubstituted CNC analog (4 with $L1^{Me,H}$, FIG. 7) does not perform well in comparison ($TON_{max}=3$). Catalyst 2 is more robust and gave the most turnovers when compared with 3 ($[(L1^{Me,OMe})Ru(CH_3CN)_3]^{2+}$) and with the literature benchmark ($[cis-(bipy)_2Ru(CO)_2]^{2+}=1$) (FIG. 9).

Furthermore, preliminary data using time-correlated single photon counting (TCSPC) has shown that catalysts 2 and 4 reduce the excited-state lifetime of the photosensitizer by an equal amount (1500 ns for $Ir(ppy)_3$ in the absence of 2 or 4 versus ~800 ns in the presence of 2 or 4). This suggests both 2 and 4 efficiently undergo electron transfer to generate a reduced catalyst. This further suggests that catalyst 2 cycle may include sluggish attack on $CO_2$ or the product (CO) inhibiting turnover of the catalyst. Computationally, catalysts 2 and 4 exhibit only subtle mechanistic differences involving the thermodynamic energies for various intermediates in their catalytic cycles.

Metal Complexes Having OH Derivatives.

Catalyst $14_{Ru,OH}$ has been synthesized and characterized by $^1$H-NMR, IR, and MS methods. Initial studies with $14_{Ru,OH}$ for light driven $CO_2$ reduction with a PS and a SD produced 13 TON for $H_2$ and 2 TON for CO over 20 h. Adding triflic acid resulted in slightly more CO formation (3 TON) and eliminated $H_2$ formation. This switch in catalyst selectivity for CO production over H+ reduction in the presence of added H+ is interesting. While it appears that the OH substituted catalyst is more vulnerable to decomposition from preliminary photocatalytic work (cf. 250 TON of CO with the OR=OMe in 2), the change in product selectivity through deactivating a pathway is interesting mechanistically. Understanding this on/off behavior can aid with rational catalyst design. Catalyst $14_{Ru,OBn}$ has also been isolated and it shows activity (10 TON of CO in 20 h), presumably due to deprotection in situ to form $14_{Ru,OH}$.

Non-Photosensitized $CO_2$ Reduction.

Complexes as shown in FIG. 7B have been synthesized which features a phenyl group for added steric bulk near the metal center, a benzimidazole derived NHC, and a methoxy group on the pyridine ring. Initial photocatalytic results for $CO_2$ reduction to CO show $TON_{max}$ recited in Table 4. This unique reactivity may be due to the Ph substituent, the benzimidazole derived NHC, or both acting synergistically. $15_{Ru,Me}$ (FIG. 7B) was synthesized to better understand this. Data suggests that both the Ph substituent and the benzimidazole NHC contribute to higher activity. Synthetic and computational experiments highlights how these substituents improve activity. Steric bulk and electronic differences (aryl is electron withdrawing relative to alkyl) can lead to significant reactivity differences in reactivity. The reactions exemplified above have used $Ir(ppy)_3$ as the PS.

Furthermore, $15_{Ru,R''}$ (R''=Ph, Me) complexes can perform photocatalytic $CO_2$ reduction without a PS. These non-sensitized photochemical reactions have been rare. The catalysts described herein provide turnover numbers that far surpass the comparable literature examples. For example, complex 16B generates 55 TON of CO in 16 h (entry 5, Table 4). Non-photosensitized reactions in the presence of catalysts in the literature are also provided in Table 4.

TABLE 4

Catalysis of $CO_2$ reduction in the absence or presence of a PS.

| Entry | Catalyst | $TON_{max}$ of CO @ time (h) | $TON_{max}$ ($h^{-1}$) @ time (h) | $TOF_{init}$ @ 0.33 h |
|---|---|---|---|---|
| 1 | 4 | 40 @ 200 | 0.42 @ 120 | 0 |
| 2 | $15_{Me}$ | 10 @ 96 | 0.27 @ 0.33 | 0.27 |
| 3 | $15_{Ph}$ | 8 @ 22 | 1.1 @ 4 | 0.009 |
| 4 | 16A | 15 @ 95 | 0.70 @ 1 | 0.64 |
| 5 | 16B | 55 @ 16 | 8.3 @ 0.33 | 8.3 |
| 6[a] | Re(bipy)(CO)$_3$Br | 14 @ 4 | — | — |
| 7[b] | [Ir(ppy)(terpy)Cl]$^+$ | 3.2 @ 1 | — | — |
| 8[a] | [Ir(ppy)(terpy)Cl]$^+$ | 97 @ 1 | — | — |

[a]Entries 6 and 7 use the benchmark catalyst from Lehn and Ishitani under the same conditions as entries 1-3.
[b]Entry 8 uses Ishitani's conditions with Delcamp's photolamp.

Controlling the Selectivity of $CO_2$ Reduction.

High selectivity for CO production, which is atypical for catalysis with ruthenium, has been shown. Preliminary experiments (in Table 5) to determine how the conditions led to this selectivity using both catalyst 2 and the literature benchmark $[cis-(bipy)_2Ru(CO)_2]^{2+}=1$ were conducted. With catalyst 1, comparing entries 1 and 2 shows that the electron source matters and BIH provides a greater thermodynamic driving force for electron transfer with more CO formation. Entries 2 and 3 show that the proton source matters and anhydrous conditions favors CO production. It was postulated that water may protonate the reduced metal and lead to hydride formation, which in turn leads to greater formate production. Entries 2 and 4 show that the solvent influences selectivity and acetonitrile favors formate production. Lastly, entry 5 shows that the conditions for CO production can be optimized by using $Ir(ppy)_3$ as the PS and acetonitrile solvent. Comparing entries 3 and 5, the PS does not change the selectivity, but using $Ir(ppy)_3$ does lead to improved TON values. With catalyst 2, entry 6 shows that formate production can be optimized, and the CNC pincer complex is more selective than the benchmark, 1 (entry 1), but 2 does not produce as much TON of formate. Entries 5 and 7 show that catalyst 2 performs best at CO formation, and 2 is highly robust and produces a much greater TON than 1. Similarly, entries 7 and 8 show that DMF leads to even great amounts of CO formation, and within the literature on using DMF for $CO_2$ reduction these numbers are competitively high but not record setting. Thus the factors that lead to selectivity can be determined and the production of formate or CO can be controlled. The catalysts described herein seem especially well designed for CO formation.

TABLE 5

Controlling the selectivity of $CO_2$ reduction with the literature benchmark [cis-(bipy)$_2$Ru(CO)$_2$]$^{2+}$ = 1 and catalyst 2.

| Entry | Cat. | PS | H$^+$/e$^-$ source | Solvent | TON$_{max}$ of CO @ time (h) | TON of HCO$_2^-$ | Selectivity |
|---|---|---|---|---|---|---|---|
| 1 | 1 | [Ru(bipy)$_3$]$^{2+}$ | BNAH/H$_2$O | DMF | 20 | 126 | 86% HCO$_2^-$ |
| 2 | 1 | [Ru(bipy)$_3$]$^{2+}$ | BIH/H$_2$O | DMF | 78 @ 20 | 68 | 53% CO |
| 3 | 1 | [Ru(bipy)$_3$]$^{2+}$ | BIH/TEA | DMF | 51 @ 4 | 0 | 100% CO |
| 4 | 1 | [Ru(bipy)$_3$]$^{2+}$ | BIH/H$_2$O | MeCN | 31 @ 2 | 117 | 79% HCO$_2^-$ |
| 5 | 1 | Ir(ppy)$_3$ | BIH/TEA | MeCN | 74 | 0 | 100% CO |
| 6 | 2 | [Ru(bipy)$_3$]$^{2+}$ | BNAH/H$_2$O | DMF | 0.6 @ 4 | 18 | 97% HCO$_2^-$ |
| 7 | 2 | Ir(ppy)$_3$ | BIH/TEA | MeCN | 250 @ 40 | 0 | 100% CO |
| 8 | 2 | Ir(ppy)$_3$ | BIH/TEA | DMF | 341 @ 67 | 0 | 100% CO |

Nickel Catalysts for Light Driven $CO_2$ Reduction.

The CNC pincer ligand with an O— group on the central pyridine ring is shown as chemical structures 9 and 9A herein. The pK$_a$ value in DMSO (5.4) was determined for the equilibrium between the OH and O— substituted derivatives. The protonation state switches the catalysis on or off. Catalyst 9(O-derivative) achieves TON$_{max}$=10.6 in 5 h whereas 9A (OH derivative) formed in situ achieves TON$_{max}$=0.9 and 10 (H derivative with L1$_{Me,H}$) achieves TON$_{max}$=0.1. This illustrates the contribution of one remote atom in designing ligands and catalysts. Herein, photocatalytic conditions lead to selective $CO_2$ reduction to form exclusively CO with a first-row metal catalyst (Ni). Electrochemical and computational studies have been undertaken to understand the differences between OH and O— groups in the catalysis. Computational studies have shown that the nickel center is significantly more electron rich with the O— substituent which has a dramatic effect on catalysis. Light driven catalysts using earth-abundant metals are rare and the ability to switch such catalysts on or off with protonation events is novel.

Iron and Cobalt Catalysts for Light Driven $CO_2$ Reduction.

With methyl wingtips on the NHC in L1$_{Me}$,O$_{Me}$ this ligand prefers to form bis(ligand) complexes: [(L1$_{Me,OMe}$)$_2$M]$^{n+}$=12 & 13, with M=Fe(II) and Co(III) with a low spin and diamagnetic d6 configuration (FIG. 8A). Both complexes have been fully characterized by spectroscopic and MS methods, and the Fe(II) complex, [12Fe](OTf)$_2$ has been crystallographically characterized (FIG. 8B).

Summary:

This example includes at least 4 key developments on the subject of electrochemical and photochemical $CO_2$ reduction:

1. Conditions were developed for selective $CO_2$ reduction with ruthenium and nickel based catalysts. Furthermore, with Ru, factors control the selectivity and for obtaining CO or formate (or a customized mixture) has been shown.

2. Two ruthenium catalysts (2 and 3) are highly robust (lifetimes=40 and 20 h, respectively) and moderately active (TON=250 for 2). Catalyst 15$_{Ru,Ph}$ has high activity (TOF=143 h$^{-1}$).

3. The ruthenium catalyst 15$_{Ru,Ph}$ Can perform non-sensitized photocatalytic $CO_2$ reduction. Optimal activity appears to require the benzimidazole derived NHC, aryl wingtips, and a methoxy substituent.

4. With both ruthenium and nickel catalysts, substituent effect with the remote substituent para to N on the pyridine ring play a role in the activity of the catalyst. Furthermore, with OH groups, the protonation state can influence reactivity, but methoxy groups produce more active catalysts.

A means of controlling and understanding $CO_2$ reduction through synthetic manipulation of substituents, testing for $CO_2$ reduction under photo-catalytic and electrocatalytic conditions, and performing mechanistic and computational studies have been determined.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A compound having Formula I

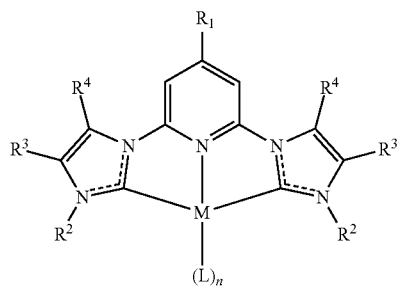

wherein,

R$^1$ is OH, O$^-$, halogen, amine, —O-alkyl, —O-alkenyl, alkynyl, —O-aryl, —O-heteroaryl, —O-benzyl, O-cycloalkyl, or —O-cycloalkenyl, wherein R$^1$ is optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfooxo, sulfonyl, sulfone, sulfoxide, thiol, phosphonyl, or photosensitizer;

each R$^2$ is, independent of the other, alkyl, alkenyl, alkynyl, aryl, or heteroaryl, wherein R$^2$ is optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol;

each $R^3$ and $R^4$ are, independent of the other, hydrogen, alkyl, alkenyl, alkynyl, aryl, or heteroaryl, wherein $R^3$ and $R^4$ are optionally substituted with alkyl, alkoxy, alkenyl, alkynyl, aryl, heteroaryl, aldehyde, amino, carboxylic acid, ester, ether, halide, hydroxy, ketone, nitro, cyano, silyl, sulfo-oxo, sulfonyl, sulfone, sulfoxide, or thiol, or $R^3$ and $R^4$ combine together with the atoms to which they are attached to form a cycloalkyl, cycloheteroaryl, aryl, or heteroaryl;

M is Ni, Ru, Fe, Co, or Ir;

each L is independently chosen from Cl, Br, $CH_3CN$, DMF, $H_2O$, bipyridine, phenylpyridine, $CO_2$, and a CNC-pincer ligand; and n is 1, 2, or 3.

2. The compound of claim 1, wherein $R^1$ is OH, $O^-$, halogen, or optionally substituted amine, —O-alkyl, —O-benzyl, or —O-aryl.

3. The compound of claim 1, wherein $R^1$ is O-alkyl.

4. The compound of claim 1, wherein $R^3$ and $R^4$ combine together with the atoms to which they are attached to form an aryl or heteroaryl.

5. The compound of claim 1, wherein $R^3$ and $R^4$ are both hydrogen.

6. The compound of claim 1, wherein M is Ni, Ru, Fe, Co, or Ir.

7. The compound of claim 1, wherein at least one L is Cl, Br, $CH_3CN$, DMF, $H_2O$, bipyridine or phenylpyridine.

8. The compound of claim 1, wherein the compound is

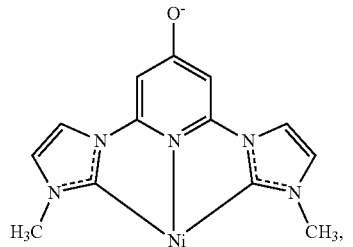

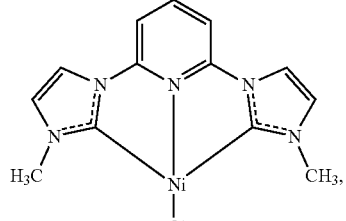

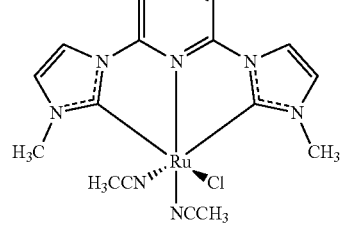

-continued

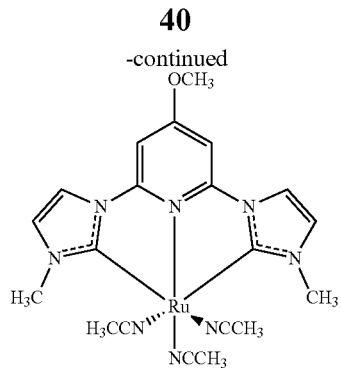

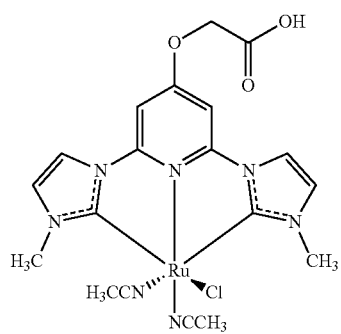

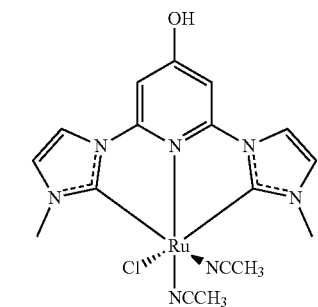

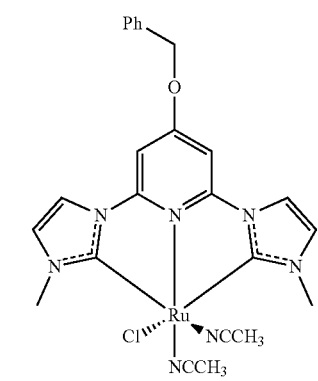

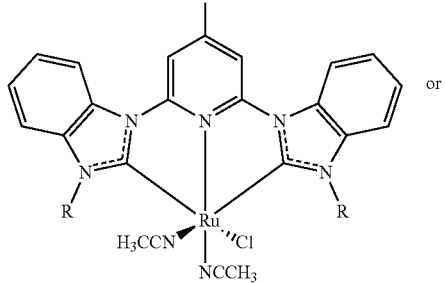

or

-continued

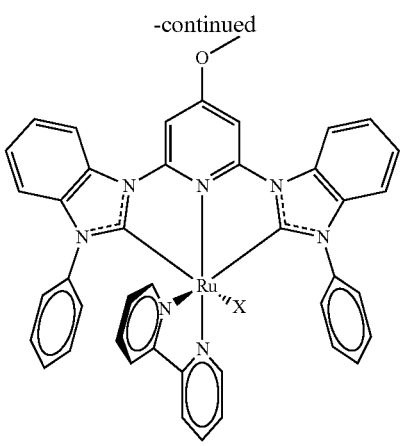

wherein R″ is methyl or phenyl, and X is Cl, Br, or CH₃CN.

9. The compound of claim 1, further comprising one or more counteranions selected from I⁻, Br⁻, CF₃COO⁻, BF₄⁻, or PF₆⁻.

10. A catalytic system, comprising:
a compound of claim 1; and
b. an electron donor.

11. The catalytic system of claim 10, further comprising a photosensitizer.

12. The catalytic system of claim 10, wherein the photosensitizer is Ru(bpy)₃, Ir(ppy)₃, Cu(dmbpy)₂, Os(bpy)₃, Ru(phen)₃, or a derivative or a mixture thereof.

13. The catalytic system of claim 10, wherein the system does not include a photosensitizer.

14. The catalytic system of claim 13, wherein R³ and R⁴ combine together with the atoms to which they are attached to form an aryl or heteroaryl.

15. The catalytic system of claim 10, wherein the electron donor is an amine or alcohol.

16. The catalytic system of claim 15, wherein the electron donor is trimethylamine, triethanolamine (TEOA), (1,3-dimethyl-2-phenyl-2,3-dihydro-1H-benzo[d]imidazole) (BIH), 1-benzyl-1,4-dihydropyridine-3-carboxamide (BNAH); 1-(4-methoxybenzyl)-1,4-dihydropyridine-3-carboxamide (BNAH-OMe), 5-(1,2-dihydroxyethyl)-3,4-dihydroxyfuran-2(5H)-one (AA), and tetramethyl-para-analine.

17. The catalytic system of claim 10, further comprising a polar aprotic solvent.

18. The catalytic system of claim 10, further comprising CO₂.

19. A method of converting CO₂ to CO, comprising: contacting a catalyst system with CO₂ and irradiating with light, wherein the catalyst system comprises,
a compound of claim 1; and
b. an electron donor.

20. The method of claim 19, wherein the method produces substantially no formate, formic acid, or methane.

* * * * *